United States Patent
Boyer et al.

(10) Patent No.: US 9,129,112 B2
(45) Date of Patent: Sep. 8, 2015

(54) METHODS, SYSTEMS AND MACHINE-READABLE MEDIA FOR PROVIDING SECURITY SERVICES

(71) Applicant: Oracle International Corporation, Redwood Shores, CA (US)

(72) Inventors: John Jules Alexander Boyer, Ottawa (CA); Ali Kamran Ahmed, Sunnyvale, CA (US); Tim Shephard, Gibsons (CA); Vinay Prabhu, Sunnyvale, CA (US); Ruchir Tewari, Mountain View, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 130 days.

(21) Appl. No.: 13/841,498

(22) Filed: Mar. 15, 2013

(65) Prior Publication Data

US 2014/0282833 A1 Sep. 18, 2014

(51) Int. Cl.
*G06F 21/57* (2013.01)
*G06F 21/12* (2013.01)
*G06F 21/60* (2013.01)

(52) U.S. Cl.
CPC ............ *G06F 21/57* (2013.01); *G06F 21/125* (2013.01); *G06F 21/602* (2013.01)

(58) Field of Classification Search
CPC ..... G06F 21/12; G06F 21/121; G06F 21/125; G06F 21/57
USPC .......................................................... 726/30
See application file for complete search history.

(56) References Cited

U.S. PATENT DOCUMENTS

| 5,892,904 | A | * | 4/1999 | Atkinson et al. ................. 726/22 |
| 5,923,756 | A | | 7/1999 | Shambroom |
| 6,151,606 | A | | 11/2000 | Mendez |
| 6,226,618 | B1 | | 5/2001 | Downs et al. |

(Continued)

FOREIGN PATENT DOCUMENTS

| EP | 0 474 131 A2 | 3/1992 |
| EP | 1122640 A1 | 8/2001 |

(Continued)

OTHER PUBLICATIONS

MacNN Forum thread "How to re-sign Apple's applications once they've been modified" Dec. 2, 2007 (4 pages) http://forums.macnn.com/79/developer-center/355720/how-re-sign-apples-applications-once/.*

(Continued)

*Primary Examiner* — Joseph P Hirl
*Assistant Examiner* — Thomas Gyorfi
(74) *Attorney, Agent, or Firm* — Kilpatrick Townsend & Stockton LLP

(57) ABSTRACT

Systems, methods and machine-readable media for providing a security service are disclosed. The methods include receiving a modification of the application object code to allow the software application to transmit a request for the security service; retrieving the modified application object code corresponding to the software application from memory; receiving, via a processor, the request for the security service from the modified application object code; and providing, via the processor, the security service. The systems and machine-readable media performing operations according to the methods disclosed.

32 Claims, 17 Drawing Sheets

(56) References Cited

U.S. PATENT DOCUMENTS

| | | | |
|---|---|---|---|
| 6,317,868 B1 * | 11/2001 | Grimm et al. | 717/127 |
| 6,324,648 B1 | 11/2001 | Grantges, Jr. | |
| 6,735,763 B1 * | 5/2004 | Enokida | 717/143 |
| 6,993,137 B2 | 1/2006 | Fransdonk | |
| 7,159,120 B2 | 1/2007 | Muratov | |
| 7,184,801 B2 | 2/2007 | Farcasiu | |
| 7,243,163 B1 | 7/2007 | Friend et al. | |
| 7,275,073 B2 | 9/2007 | Ganji et al. | |
| 7,447,799 B2 | 11/2008 | Kushner | |
| 7,596,565 B2 | 9/2009 | Friend et al. | |
| 7,620,001 B2 | 11/2009 | Ganji | |
| 7,620,392 B1 | 11/2009 | Maurya et al. | |
| 7,702,322 B1 | 4/2010 | Maurya et al. | |
| 7,788,382 B1 | 8/2010 | Jones et al. | |
| 7,849,451 B2 * | 12/2010 | Palacz et al. | 717/148 |
| 7,886,148 B2 * | 2/2011 | Kiriansky et al. | 713/166 |
| 8,001,082 B1 | 8/2011 | Muratov | |
| 8,284,933 B2 | 10/2012 | Chaisson et al. | |
| 8,549,656 B2 | 10/2013 | Blaisdell et al. | |
| 8,584,118 B2 | 11/2013 | Kotamarthi et al. | |
| 8,595,841 B2 | 11/2013 | Britton et al. | |
| 2002/0169954 A1 | 11/2002 | Bandini et al. | |
| 2004/0006630 A1 | 1/2004 | Friend et al. | |
| 2004/0117310 A1 | 6/2004 | Mendez et al. | |
| 2004/0163088 A1 | 8/2004 | Frender et al. | |
| 2004/0224675 A1 | 11/2004 | Puskoor et al. | |
| 2005/0154886 A1 | 7/2005 | Birk et al. | |
| 2005/0240943 A1 * | 10/2005 | Smith et al. | 719/328 |
| 2006/0277408 A1 | 12/2006 | Bhat et al. | |
| 2007/0234408 A1 | 10/2007 | Burch et al. | |
| 2008/0037593 A1 | 2/2008 | Friedman et al. | |
| 2008/0060080 A1 | 3/2008 | Lim | |
| 2008/0289019 A1 | 11/2008 | Lam | |
| 2008/0292103 A1 | 11/2008 | Lee et al. | |
| 2008/0320566 A1 | 12/2008 | Herzog et al. | |
| 2009/0222792 A1 | 9/2009 | Shanbhogue et al. | |
| 2009/0288143 A1 | 11/2009 | Stebila et al. | |
| 2009/0300656 A1 | 12/2009 | Bosworth et al. | |
| 2009/0307191 A1 | 12/2009 | Li et al. | |
| 2010/0057845 A1 | 3/2010 | Thomas et al. | |
| 2010/0174974 A1 | 7/2010 | Brisebois et al. | |
| 2010/0212028 A1 * | 8/2010 | Eriksson et al. | 726/32 |
| 2011/0047451 A1 | 2/2011 | Jardine-Skinner et al. | |
| 2011/0191593 A1 | 8/2011 | Cheng | |
| 2011/0258345 A1 | 10/2011 | Bhanote | |
| 2012/0047451 A1 | 2/2012 | Marmaros | |
| 2013/0014275 A1 | 1/2013 | Goodes et al. | |
| 2013/0262687 A1 | 10/2013 | Avery et al. | |
| 2013/0326221 A1 | 12/2013 | Murphy et al. | |
| 2013/0332723 A1 | 12/2013 | Tan et al. | |
| 2014/0018048 A1 | 1/2014 | Anand et al. | |

FOREIGN PATENT DOCUMENTS

| | | |
|---|---|---|
| EP | 1 458 151 A1 | 9/2004 |
| EP | 1 841 174 A1 | 10/2007 |
| EP | 2 692 162 A1 | 2/2014 |
| WO | 97/26731 A1 | 7/1997 |
| WO | WO 9726731 A1 * | 7/1997 |
| WO | 03/102753 A1 | 12/2003 |
| WO | WO 03102753 A1 * | 12/2003 |
| WO | 2007/047183 A2 | 4/2007 |

OTHER PUBLICATIONS

Elbaz, "Using Public Key Cryptography in Mobile Phones," DISCRETIX Technologies, Oct. 2002, 9 pages, http://dev1.discretix.com/wp-content/uploads/2013/02/Using_Public_Key_Cryptography_in_Mobile_Phones.pdf.

FacileLogin, "Landscapes in Mobile Application Security", Oct. 2013, 5 pages, http://blog.facilelogin.com/2013/10/landscapes-in-mobile-application.html.

Huawei AnyOffice Mobile Security Solution, Huawei Technologies Co., Ltd., 2013 http://enterprise.huawei.com/ilink/enenterprise/download/HW_277458, 12 pages.

Mallikarjuna et al., "Unveiling of Android Platform," IJARCSSE, Jul. 2013, vol. 3, Issue 7, pp. 1264-1267, http://www.ijarcsse.com/docs/papers/Volume_3/7_July2013/V3I7-0441.pdf.

https://groups.google.com/forum/#!msg/three20/6mBrQRRWXnU/yxWNZuDrnY0J; Google Groups on iOS Swizzle; May 11, 2010.

http://www.consumerizeit.com/blogs/consumerization/archive/2012/06/08/app-wrapping-with-mocana-mobile-app-protection.aspx; Article on Mocana Mobile; Aug. 6, 2012.

https://apperian.jira.com/wiki/display/pub/Application+Policies#ApplicationPolicies-EncryptedDAR(DataRest); About EASE; Feb. 26, 2013.

http://www.consumerizeit.com/blogs/consumerization/archive/2012/05/11/citrix-synergy-2012-video-cloudgateway-2-mobile-application-management.aspx; CloudGateway; May 11, 2012.

http://www.consumerizeit.com/blogs/consumerization/archive/2012/05/11/citrix-synergy-2012-video-a-first-look-at-appsense-rapsphere-mobile-app-management-and-app-wrapping.aspx; App Sense RapSphere; May 11, 2012.

http://blog.iosplace.com/?p=33; ios Place; Oct. 1, 2010.

http://reverse.put.as/wp-content/uploads/2011/06/mach-o_infection.ppt; Mach-o-infection.

http://stackoverflow.com/questions/8825537/mach-o-symbol-stubs-ios; stackoverflow; Jan. 11, 2012.

http://networkpx.blogspot.com/2009/09/about-Icdyldinfoonly-command.html; network px blogspot; Sep. 20, 2009.

http://www.amazon.com/Mac-OS-Internals-Systems-Approach/dp/0321278542; A. Singh; *Mac OS X Internals: A Systems Approach*; pp. 61-74; Jun. 29, 2006, Addison-Wesley Professional, Boston, Massachusetts.

http://www.amazon.ca/Hacking-Securing-iOS-Applications-Hijacking/dp/1449318746/ref=pd_bxgy_b_img_b/184-9916216-5442607; J. Zdziarski; *Hacking and Securing iOS Applications*; Hacking Part-1, pp. 189-202; Hacking Part-2, pp. 149-156 and pp. 203-208; Jan. 25, 2012; O'Reilly Media, Sebastopol, California.

http://books.google.ca/books?id=1kDcjKcz9GwC&printsec=frontcover#v=onepage&q&f=false; Charlie Miller, et al.; *iOS Hackers' Handbook*, Chapter4: Code Signing and Memory Protections, pp. 69-105; Google Books; May 8, 2012, John Wiley & Sons, Indianapolis, Indiana.

PCT Application No. PCT/US2014/029552, International Search Report and Written Opinion, Jul. 1, 2014, 13 pages.

PCT Application No. PCT/US2014/029680, International Search Report and Written Opinion, Jul. 1, 2014, 13 pages.

PCT Application No. PCT/US2014/029586, International Search Report and Written Opinion, Jul. 31, 2014, 10 pages.

* cited by examiner

METHODS, SYSTEMS AND MACHINE-READABLE MEDIA FOR PROVIDING SECURITY SERVICES

BACKGROUND

The present disclosure relates generally to systems, methods and machine-readable media for providing security services. More particularly, this disclosure relates to systems, methods and machine-readable media for providing security services to software applications, including authentication, authorization, auditing, single sign on, security policy enforcement, key management and distribution, secure communication, secure data storage, and secure data sharing, among others.

SUMMARY

Systems, methods and machine-readable media for providing a security service are disclosed. According to a feature of the present disclosure, the system includes a memory and a processor. The memory may be used for storing a plurality of application data, each application data associated with a software application and comprising an application object code. The processor may comprise a security manager application module. The security manager application module may be responsive to a request, via the software application, for the security service from the application object code modified by an object code modification module, the modified application object code facilitates transmission of the request for the security service to the security manager application module.

In one embodiment, the object code modification module may be used to modify the application object code by at least one of introducing a dynamic or static library, adding a load command, symbol replacement, swizzling, and interposing. In another embodiment, the security manager application module may generate security artifacts selected from a group consisting of authentication tokens, authentication keys and secure communication channels, the security manager application module transmitting the security artifacts to the software application in response to receiving the request for the security service. The application object code received and modified by the object modification module may be in an unsigned form.

According to a feature of the present disclosure, the application object code may be converted by an object code signature conversion module from a signed form to an unsigned form prior to modification of the application object code by the object code modification module, and converted from an unsigned form to a signed form after modification of the application object code by the object code modification module. In one embodiment, the object code modification module may convert the application object code from a signed form to an unsigned form prior to modification of the application object code, and may convert the application object code from an unsigned form to a signed form after modification of the application object code.

In one embodiment, the modification of the application object code may include modifying at least one of a programmatic interface, class, object and function utilized by the software application. The modification of the application object code may include an introduction of a policy engine for ensuring compliance with security policies. The security policies may be selected from a group consisting of data leakage prevention and access control policies.

According to a feature of the present disclosure, the security manager application module may include a policy engine for ensuring compliance of the software application with security policies. The security manager application module may transmit the security policies to the software application for execution. The security policies may apply to at least one of a portion of the software application, a single software application, and a plurality of software applications. In one embodiment, the policy engine is a dynamic policy engine, the security policies based on at least one factor selected from a group consisting of execution context, external events, explicit policy redefinition, and changing group and role membership. In another embodiment, the security policies are retrieved from a remote policy server. In yet another embodiment, a first software application retrieves the security policies from the remote policy server and a second software application retrieves the security policies from the first software application. The data resulting from execution of the policy engine may be transmitted to the security manager application module and/or the policy server.

According to a feature of the present disclosure, the security manager application module, responsive to the request, via the software application, for the security service, may facilitate the security service if the software application is signed with a PKI key. The security manager application module may confirm that the software application and associated computing platform have not been compromised, and may verify the signature of the software application. In one embodiment, the plurality of application data include a common key. In another embodiment, the security manager application module may be responsive to a registration request from the software application to establish application trust. The security manager application module may prompt a user to input an application registration passcode, and generate a key to establish application trust using the application registration passcode to facilitate the security service provided by the security manager application module to the software application.

In another embodiment, the security manager application module may provide the key to the software application to allow the software application transmit the request for the security service to the security manager application module. The application data may include an application data protection key generated by the software application or the security manager application module. The application data protection key may be encrypted and decrypted by a corresponding data protection root key maintained with the security manager application module. In one embodiment, the application data protection key may perform at least one of encrypting and decrypting an object data protection key to facilitate data object transfer from a first software application to a second software application. The security manager application module may generate a data-sharing key for encrypting the object data protection key prior to transferring the data object and the object data protection key from the first software application to the second software application. The data-sharing key may also be used for decrypting the object data protection key after transferring the data object and the object data protection key from the first software application to the second software application. According to an embodiment of the present disclosure, at least one of the security manager application module and the first software application may also decrypt the object data protection key for the data object with the application data protection key of the first software application, and encrypt the object data protection key for the data object with the application data protection key of the second software application.

According to a feature of the present disclosure, a computer-implemented method for providing a security service is provided. The method may be implemented on a processor in communication with a memory having a plurality of application data, each application data associated with a software application and comprising an application object code. The method may include retrieving the application object code corresponding to the software application from memory, and receiving a modification of the application object code to allow the software application to transmit a request for the secure service, the modification comprising at least one of introducing a dynamic or static library, adding a load command, symbol replacement, swizzling, and interposing. The method may further include receiving, via the processor, the request for the security service, and providing, via the processor, the security service.

In one embodiment, the application object code is converted from a signed form to an unsigned form prior to modification, and converted from an unsigned form to a signed form after modification. The modification of the application object code may include introducing a policy engine for ensuring compliance with a security policy. The security policy may apply to at least one of a portion of the software application, a single software application, and a plurality of software applications. The security policy may be selected from a group consisting of a data leakage prevention policy and an access control policy. In one embodiment, the policy engine is a dynamic policy engine, the security policies based on at least one factor selected from a group consisting of execution context, external events, explicit policy redefinition, and changing group and role membership.

In one embodiment, the computer-implemented method includes confirming, via the processor, that the software application and associated computing platform have not been compromised, and verifying, via the processor, a PKI key signature of the software application. Also, the computer-implemented method may include receiving a registration request from the software application to establish application trust prior to receiving a request for the security service, and prompting a user, via the processor, to input an application registration passcode. The method may further include generating a key, via the processor, to establish application trust using the application registration passcode, and providing, via the processor, the key to the software application to allow the software application to transmit the request for the security service.

According to a feature of the present disclosure, the computer-implemented method may include generating an application data protection key by the processor, retrieving a corresponding data protection root key from the memory, and encrypting, via the processor, the application data protection key using the corresponding data protection root key. In one embodiment, the computer-implemented method may include decrypting, via the processor, an object data protection key for a data object with the application data protection key of a first software application; generating, via the processor, a data-sharing key for at least one of encrypting and decrypting the object data protection key; encrypting, via the processor, the object data protection key using the data-sharing key; transferring the data object and the encrypted object data protection key from the first software application to a second software application; decrypting, via the processor, the object data protection key using the data-sharing key; and encrypting, via the processor, the object data protection key for the data object with the application data protection key of the second software application.

According to a feature of the present disclosure, machine-readable media are provided. The machine readable media may provide instructions, which when read by a machine having a processor and a memory, cause the machine to perform operations according to the methods of the present disclosure.

BRIEF DESCRIPTION OF THE DRAWINGS

The above-mentioned features and objects of the present disclosure will become more apparent with reference to the following description taken in conjunction with the accompanying drawings wherein like reference numerals denote like elements and in which.

DETAILED DESCRIPTION

Figure 1:
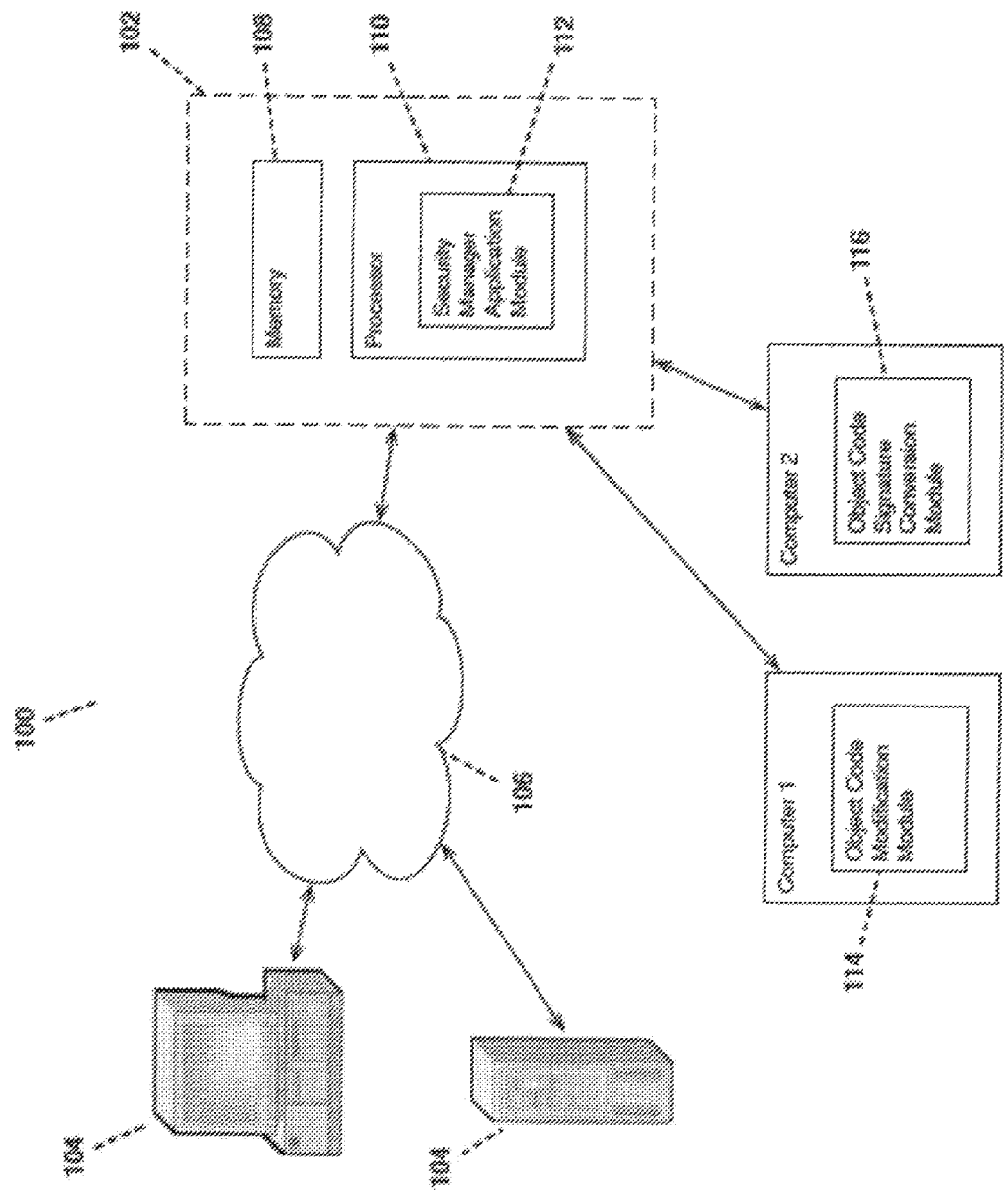
FIG. 1 illustrates a block diagram of a system for providing a security service, according to an embodiment of the present disclosure.

The following detailed description includes representative examples utilizing numerous features and teachings, both separately and in combination, and describes numerous embodiments in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

Some portions of the detailed descriptions that follow are presented in terms of algorithms and sequences of operations which are performed within a computer memory. These algorithmic descriptions and representations are the means used by those skilled in the data processing arts to most effectively convey the substance of their work to others skilled in the art. An algorithm or sequence of operations is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic device, that manipulates and transforms data represented as physical (electronic) quantities within the computer system's registers and memories into other data similarly represented as physical quantities within the electronic device's memory or registers or other such information storage, transmission or display devices.

The methods presented herein are not inherently related to any particular electronic device or other apparatus. Various general purpose systems may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the embodiments as described herein.

The present patent document describes unique systems, methods and machine-readable media for providing security services to software applications on devices, including mobile devices. These security services may include authentication, authorization, auditing, single sign on, security policy enforcement, key management and distribution, secure communication, secure data storage, and secure data sharing, among others. To this end, numerous protocols and standards are discussed and used in combination with the embodiments discussed herein. Although the embodiments described herein may be used in combination with any protocol or standard, the following protocols and standards are incorporated herein by reference in their entirety: IETF RFC 2631 (Diffie-Hellman); IEEE 1363; IETF RFC 3280 (X.509 Public Key Infrastructure); IETF RFC 4120 (Kerberos V5); IETF RFC 4178 (SPNEGO); IETF RFC 2616 (HTTP 1.1); IETF RFC 4559; IETF RFC 4556 (PKINIT for Kerberos); IETF RFC 6101/2246/5246 (SSL/TLS); SAML V1.0/1.1/2.0; OpenID; Oauth; WS-Federation; and OATH HOTP/TOTP/OCRA.

In one embodiment, a centralized security services architecture for mobile devices is provided using a security manager application. One feature of the present disclosure includes the combination of the centralized security manager application and the integration of other applications with the services provided by the security manager application by means of post-compile object code modifications.

FIG. 1 illustrates a block diagram of a system 100 for providing a security service, according to an embodiment of the present disclosure. The system 100 may include a computing device 102 that can access remote devices 104, via a network 106.

In one embodiment, the computing device 102 may include a memory 108 and a processor 110. The memory 108 may be used for storing a plurality of application data, each application data associated with a software application and comprising an application object code.

As can be appreciated, the memory 108 may be used to store and/or retrieve data, for example, in response to end user actions. As is well known, the memory may include database categories that can be divided or cross-correlated, and any combination of databases and the like can be provided from within a server. In one embodiment, any portion of the databases can be provided remotely over the network 106. The external data from an external database can be provided in any standardized form which the device 102 can understand. For example, an external database at a provider can advantageously provide end-user data in response to requests from server in a standard format, such as, for example, name, user identification, and computer identification number, and the like, and the end-user data blocks are transformed into a function call format which code modules can understand.

As can be appreciated, the memory 108 may be a storage device such as a machine-readable medium, which may be any mechanism that provides (i.e. stores and/or transmits) information in a form readable by a processor. For example, the machine-readable medium may be a read only memory (ROM), a random access memory (RAM), a cache, a hard disk drive, a floppy disk drive, a magnetic disk storage media, an optical storage media, a flash memory device or any other device capable of storing information. Additionally, machine-readable medium may also comprise computer storage media and communication media. Machine-readable medium includes volatile and non-volatile, removable and non-removable media implemented in any method or technology for storage of information such as computer-readable instructions, data structures, program modules or other data. Machine-readable medium also includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by a computer.

The computing device 102 may also include one or more functional modules, electrically and/or physically coupled to the processor 110, including a security manager application module 112. As used herein, the term module refers to logic embodied in hardware and/or firmware, or to a collection of software instructions, possibly having entry and exit points, written in a programming language, such as, for example, C++. A software module may be compiled and linked into an executable program, or installed in a dynamic link library, or may be written in an interpretive language such as BASIC. It will be appreciated that software modules may be callable from other modules, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays. The modules described herein are preferably implemented as software modules, but could be represented in hardware and/or firmware.

In one embodiment, each module is provided as a modular code object, where the code objects typically interact through a set of standardized function calls. In one embodiment, the code objects are written in a suitable software language such as C++, but the code objects can be written in any low level or high level language. In one embodiment, the code modules are implemented in C++ and compiled on a computer running on a Windows platform, iOS platform, Android platform, and the like. Artisans of skill in the art will recognize that any number of implementations, including code implementations directly to hardware, are also possible.

The security manager application module 112 may be operatively coupled to an application object code modified by an object code modification module 114 and/or an object code signature conversion module 116. The security manager application module 112 may be responsive to a request, via the software application, for a security service, for example, secure communication on the network 106. The object code modification module 114 and/or the object code signature conversion module 116 may modify the application object code to facilitate transmission of the request for the security service to the security manager application module 112. The modified application object code for each application data may be stored in the memory 108.

Figure 2:
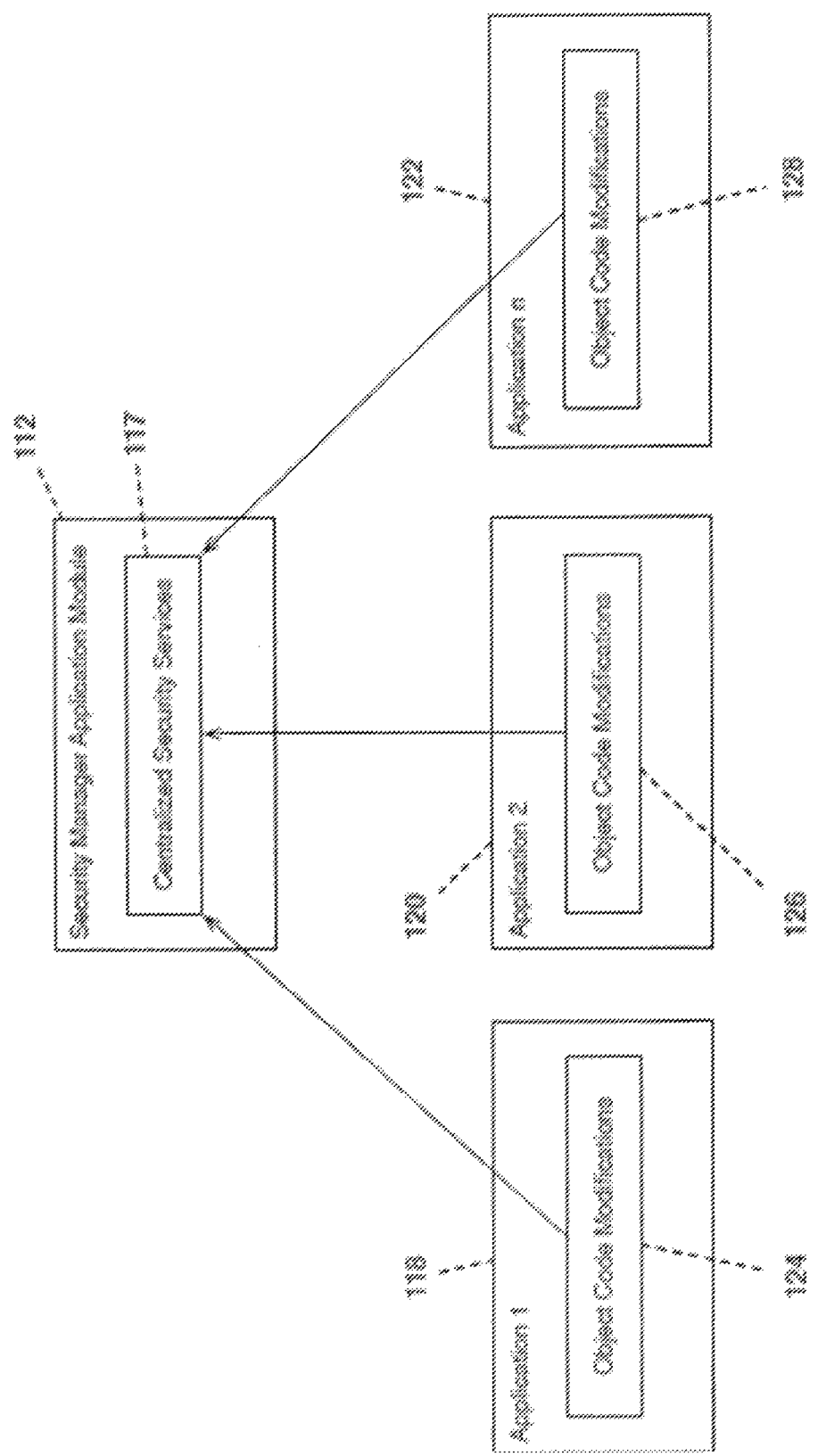
FIG. 2 illustrates a block diagram of a centralized security manager application module for providing centralized security services to other software applications residing on the same platform, according to an embodiment of the present disclosure.
Figure 3:
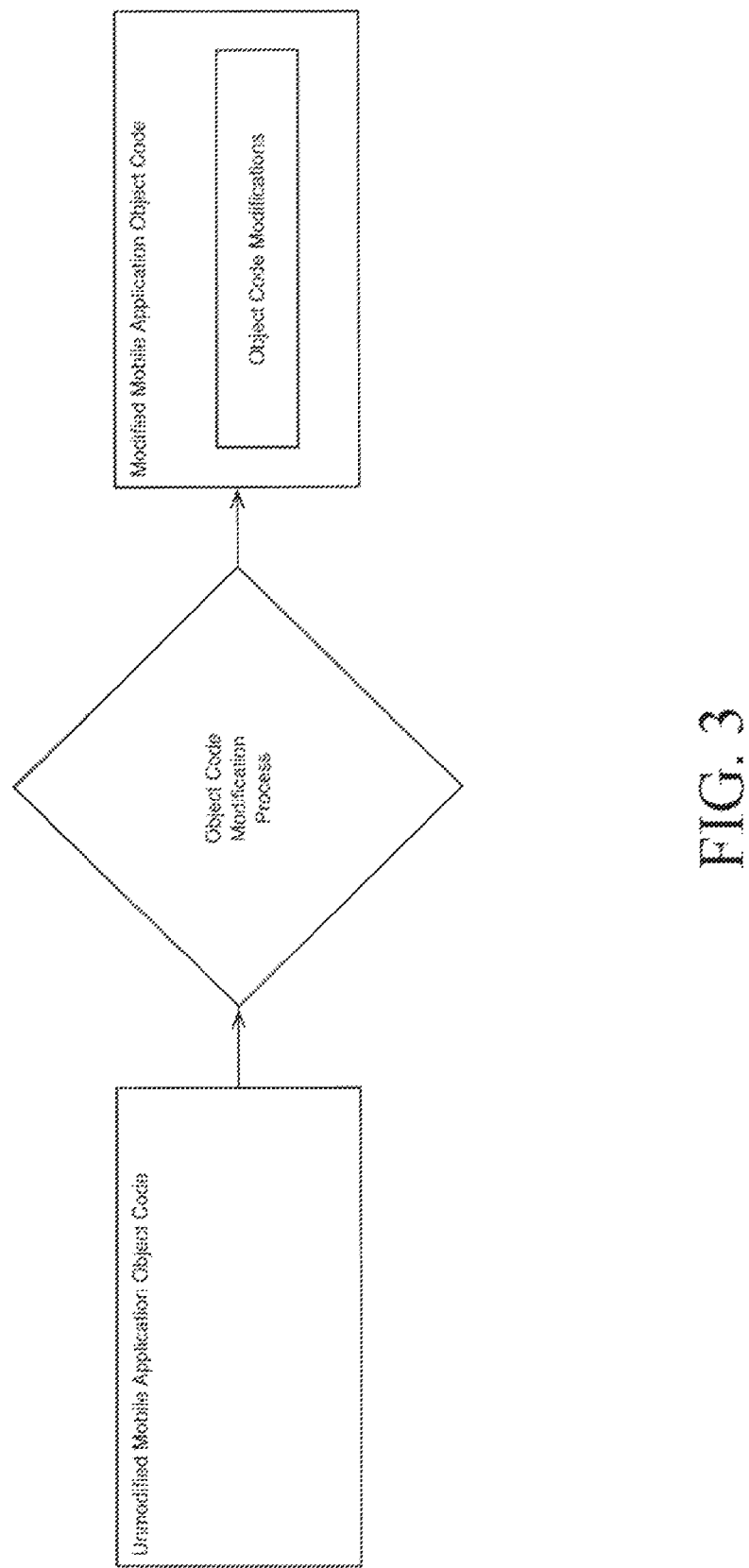
FIG. 3 illustrates an exemplary block diagram of an object code modification, according to an embodiment of the present disclosure.

FIG. 2 illustrates a block diagram of a centralized security manager application module 112 for providing centralized security services 117 to other software applications 118-122 residing on the same platform, according to an embodiment of the present disclosure. As can be appreciated, the other software applications 118-122 may be linked to the centralized security services 117 by means of modifying existing application object code 124-128, not by modifying source code in the other software applications 118-122. In one embodiment, the object code modification 124-128 may involve injecting dynamic or static libraries, adding a load command, symbol replacement, swizzling, and interposing, among other known object code modification techniques. Artisans skilled in the art would recognize that the term modification may comprise addition, replacement, and/or deletion. FIG. 3 illustrates an exemplary block diagram of an object code modification, according to an embodiment of the present disclosure.

Figure 4:
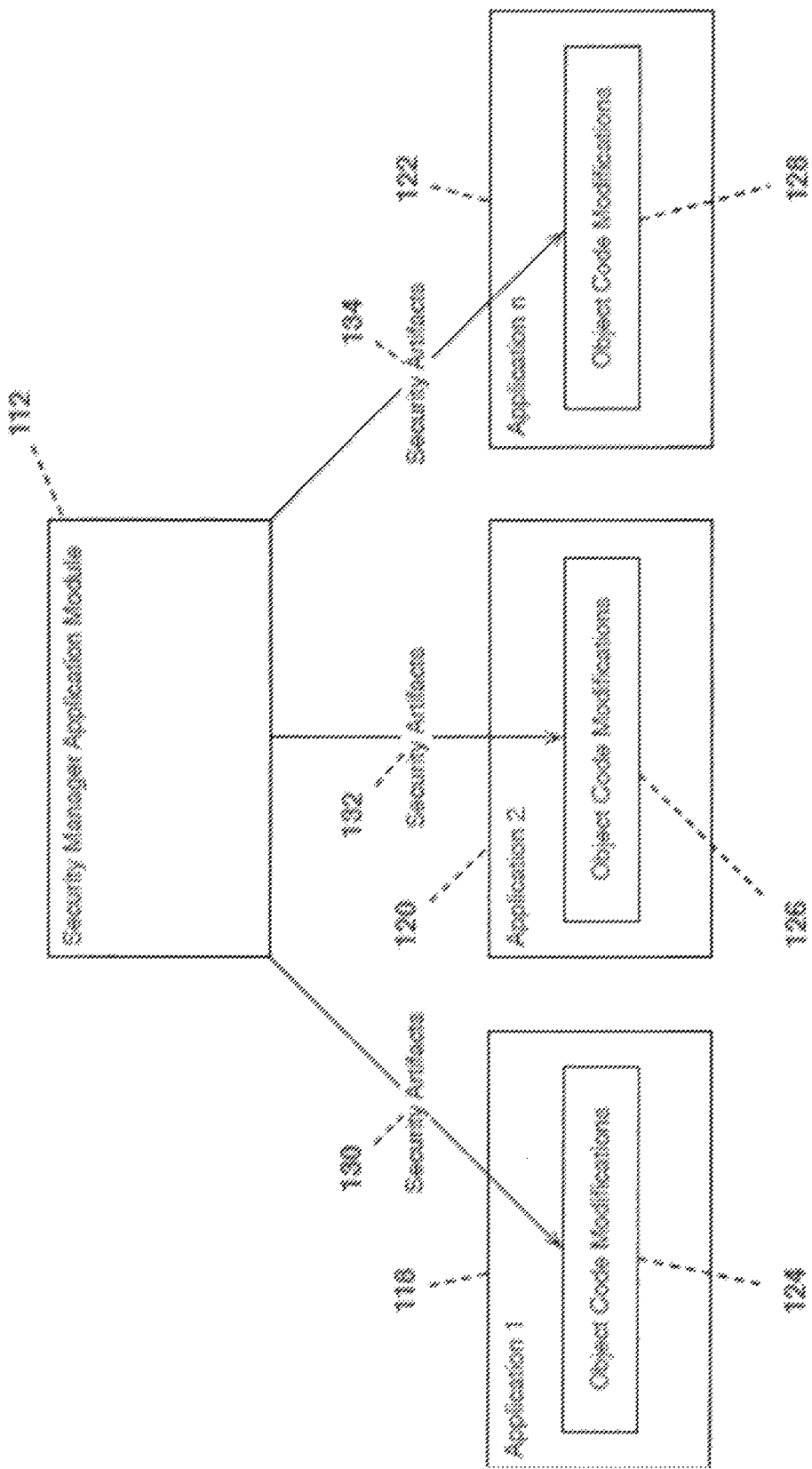
FIG. 4 is an exemplary block diagram illustrating a security manager application module transmitting security artifacts to other software applications, according to an embodiment of the present disclosure.

In one embodiment, security artifacts, such as authentication tokens, keys, credentials, single sign-on tokens, identifiers, security policies, security commands, security configurations, session handles, session tokens, and secure communications channels may be generated by the security manager application module 112 and distributed on-demand to the other software applications 118-122. FIG. 4 is an exemplary block diagram illustrating the security manager application module 112 transmitting security artifacts 130-134 to the other software applications 118-122, according to an embodiment of the present disclosure.

As can be appreciated, the security manager application module 112 may be a particular software application built specifically for that purpose (for example a secure container application). In another embodiment, the security manager application module 112 may be a modified mobile application, for example, the first application installed or launched on a given device, where the security manager functionality is part of the object code modifications described above. In one embodiment, a system with a special-purpose security manager application module may be preferred to minimize the duplication of code and functionality across multiple applications, but it is not required.

Artisans of skill in the art would recognize that there are several methods for modifying the object code. In one embodiment, a phase of the object code modifications 124-128 may be performed dynamically at the time of execution of the software application 118-122. This may allow the object code modifications 124-128 and resulting application behavior modifications to be determined based on data that is available at that time in the specific context of that execution.

Figure 5:
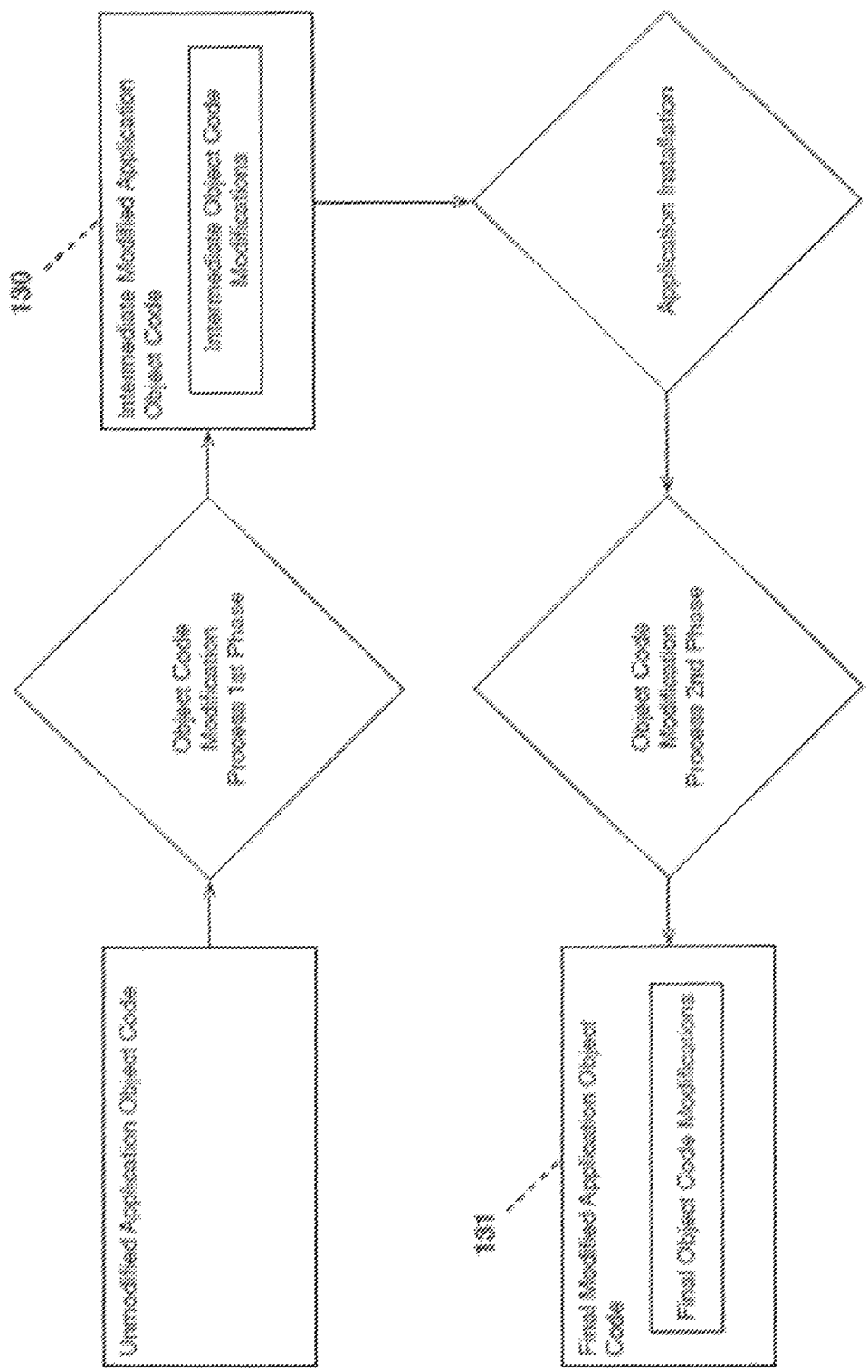
FIG. 5 is an exemplary block diagram illustrating a method of modifying the behavior of software applications by means of modifying existing application object code, according to an embodiment of the present disclosure.
Figure 6:
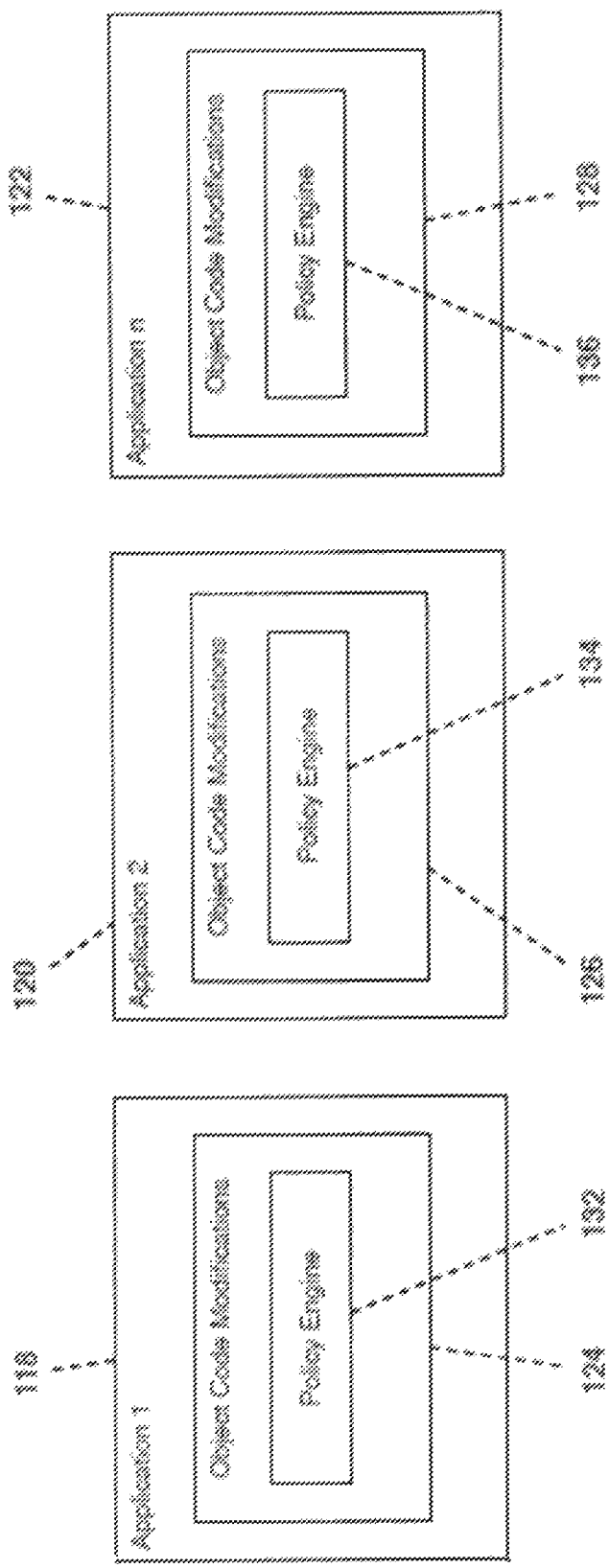
FIGS. 6-11 illustrate exemplary block diagrams of methods for modifying the behavior of a software application by injecting a policy engine in the object code, according to an embodiment of the present disclosure.

FIG. 5 is an exemplary block diagram illustrating a method of modifying the behavior of software applications 118-122 by means of modifying existing application object code, according to an embodiment of the present disclosure. The modification process may be performed in two phases. The first phase of the object code modification process may be performed before the software application 118-122 is installed on the platform where it will execute, resulting in an intermediate modified application object code 130. The second phase of the object code modification process may be performed after the software application 118-122 is installed on the platform where it will execute, resulting in a final modified application object code 131.

In one embodiment, the second phase of the object code modification process may be performed by the intermediate modified application object code 130 on itself. In another embodiment, the first and second phases of the object code modification process may be performed differently based on configuration and/or policy. As can be appreciated, the second phase of the object code modification process may be performed differently each time the application starts execution and/or during execution based on various factors, including but not limited, to the execution context, external events, explicit policy redefinition, various counters, and changing group and role membership of the user that owns the mobile device. In another embodiment, the second phase of the object code modification process may include loading some new object code from an external source.

According to an embodiment of the present disclosure, the object code modifications 124-126 may be used to modify the behavior of software applications 118-122 in a way that does not break existing application functionality. This may be accomplished by having the modified object code executed by the platform or operating system before the original unmodified application code is executed by the platform or operating system.

In one embodiment, a method of analyzing and modifying the behavior of software applications 118-122 by means of modifying existing application object code (not by modifying the application source code) is provided. The method may include analyzing the unmodified application object code and any associated configuration information to determine how it will be executed by the platform or operating system that it is intended to run on in order to extract an application execution profile; modifying the unmodified application object code and any associated configuration information in such a way that it is no longer used directly by the platform or operating system; using the application execution profile to reproduce how the unmodified application is executed by the platform or operating system in new object code, optionally with new associated configuration information; and combining the new object code with the unmodified application object code, resulting in the modified application object code 124-128.

In one embodiment, the modified object code 124-128 may include a dynamic library that is injected into the software application 118-122. As can be appreciated, a new load command that references the dynamic library may be added to a list of existing load commands present in the unmodified application object code.

As can be appreciated, the input to the object code modification process may be an unmodified mobile application object code in an unsigned form and the output from the object code modification process may be a modified mobile object code in an unsigned or signed form. In one embodiment, the process to convert the signed form of the unmodified mobile application object code to the unsigned form of the unmodified mobile application object code may be performed before the object code modification process. In another embodiment, the process to convert the unsigned form of the modified mobile application object code to the signed form of the modified mobile application object code may be performed after the object code modification process. In yet another embodiment, the process to convert the unsigned form of the intermediate modified mobile application object code to the signed form of the intermediate modified mobile application object code may be performed after the first phase of the two-phase object code modification process previously described.

In one embodiment, the object code signature conversion module 116, shown in FIG. 1, may be used to convert the application object code from a signed form to an unsigned form prior to modification of the application object code by the object code modification module 114, and may be used to convert the application object code from an unsigned form to a signed form after modification of the application object code by the object code modification module 114.

As can be appreciated, the conversion of the signed form of the unmodified application object code to the unsigned form of the unmodified application object code and/or the conversion of the unsigned form of the modified application object code to the signed form of the modified application object code may be performed as part of the object code modification process. The modified object code 124-128 may include modifications to the behavior of existing programmatic interfaces, classes, objects, and/or functions within the application itself or which the application uses. The programmatic interfaces, classes, objects, and/or functions may be provided by the mobile device platform.

In one embodiment, the process may result in an existing programmatic interface, class, object, or function being blocked, removed, replaced with an alternative implementation, and/or modified in part or in its entirety. In another embodiment, the process may result in new programmatic functionality being executed before and/or after an existing programmatic interface, class, object, or function being used. In yet another embodiment, the process may result in new programmatic functionality being executed instead of an existing programmatic interface, class, object, or function, even though the existing programmatic interface, class, object, or function is still present in the object code.

As can be appreciated, the object code modifications 124-128 may be organized in modules, where each module implements a part of the object code modifications 124-128 and the set of modules that are applied to the application during the object code modification process may be controlled by configuration and/or policy. The set of modules that are applied to the software application 118-122 during the object code modification process may be determined during the first phase and/or the second phase of the two-phase object code modification process previously described. The set of modules that are applied to the software application 118-122 during the object code modification process may also be determined by a configuration file delivered with the application.

According to an embodiment of the present disclosure, a method of modifying the storage behavior of software applications 118-122 by means of modifying existing application object code (not by modifying the application source code) is provided. The method may include replacing, using existing interposing or swizzling techniques, existing programmatic interfaces or functions that the unmodified application calls directly for storage of data with new interfaces or functions. The new programmatic interfaces or functions may be used to encrypt data when it is written and/or decrypt data when it is read. The new programmatic interfaces or functions may also call the existing programmatic interfaces or functions. As can be appreciated, the existing programmatic interfaces or functions may be provided by the mobile device platform. The existing programmatic interfaces or functions may be a part of the POSIX I/O API.

According to an embodiment of the present disclosure, a method of modifying the communication behavior of software applications 118-122 by means of modifying existing application object code is provided. The method may include pausing a communications request from the software application 118-122 using the modified application object code. The modified application object code may be used to check whether necessary security artifacts are present in the communications request. In one embodiment, if the necessary security artifacts are not present in the communications request, the modified application object code may retrieve the necessary security artifacts. After retrieving the necessary security artifacts, the modified application object code may add them to the communications request and may allow the communications request to continue. As can be appreciated, the communications request may be a network communications request.

The security artifacts may be authentication tokens, keys, credentials, single sign-on tokens, identifiers, security policies, security commands, security configurations, session handles, session tokens, or secure communications channels. The security artifacts may be retrieved from a server and/or a security manager application module 112.

FIGS. 6-11 illustrate exemplary block diagrams of methods for modifying the behavior of a software application 118-122 by injecting a policy engine 132 in the object code, according to an embodiment of the present disclosure. The method may include injecting a policy engine 132-136 into the software application 118-122 that ensures the software application 118-122 complies with security policies, including data leakage prevention policies, access control policies, and the like.

Figure 7:
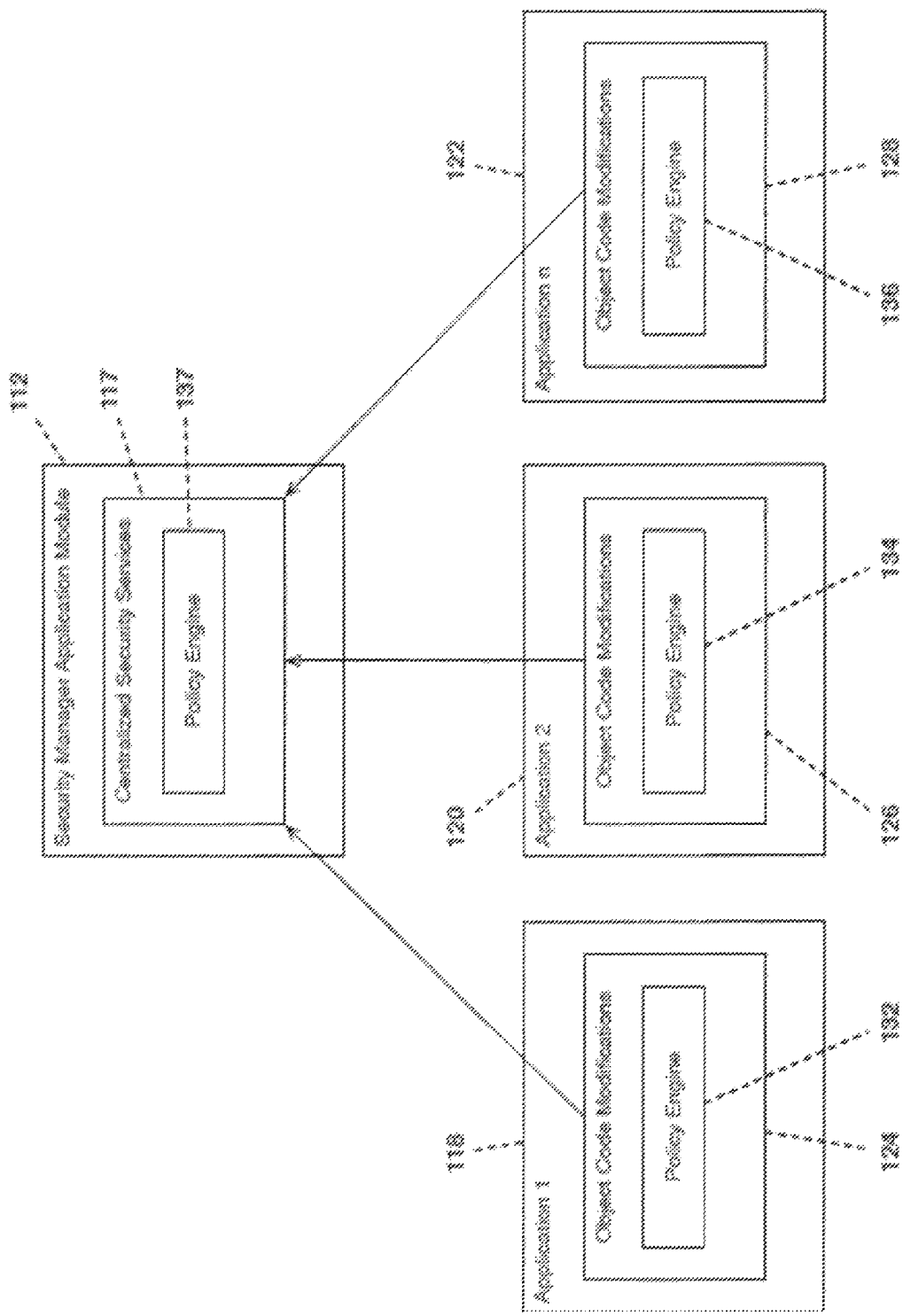
Figure 8:
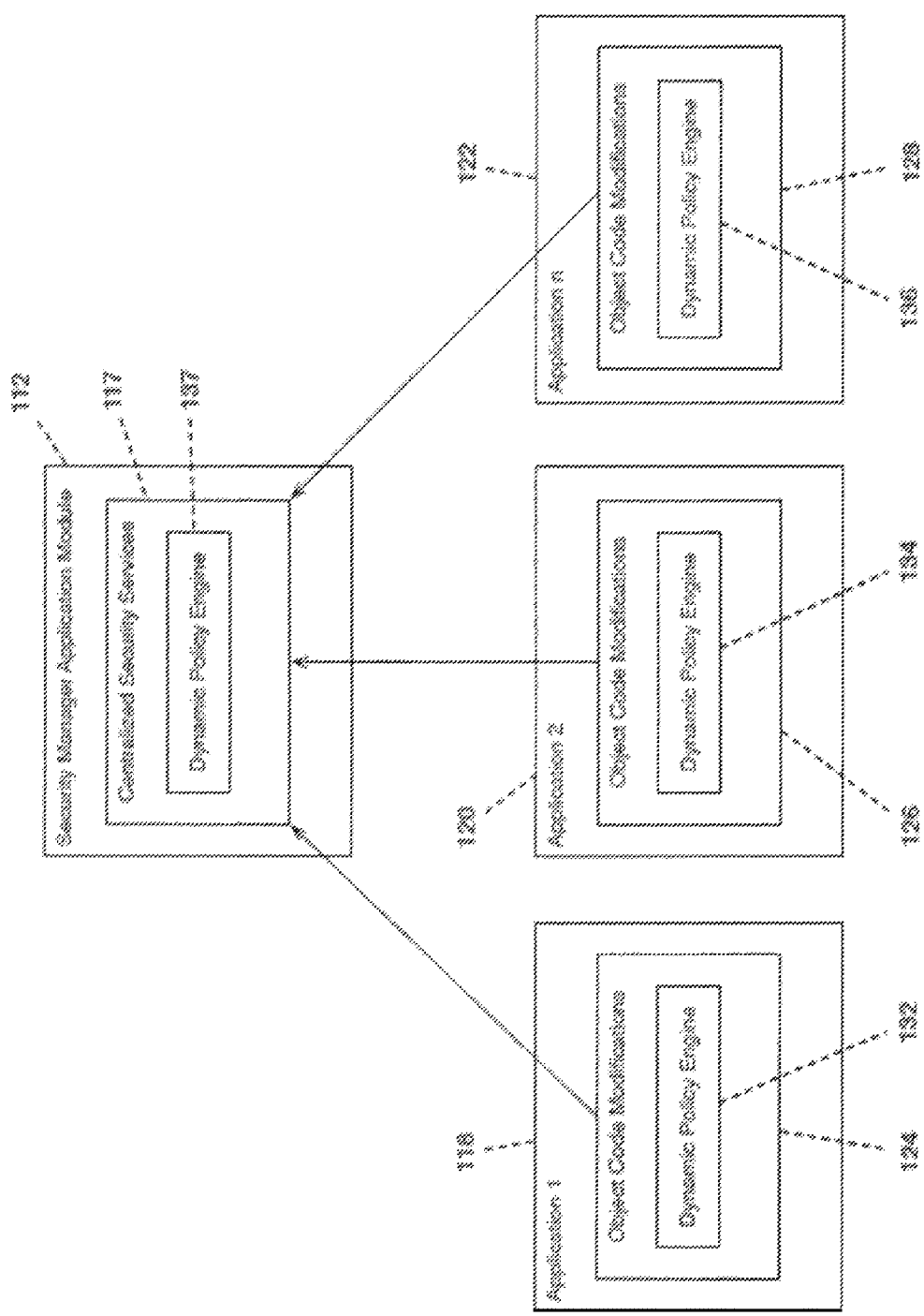
Figure 9:
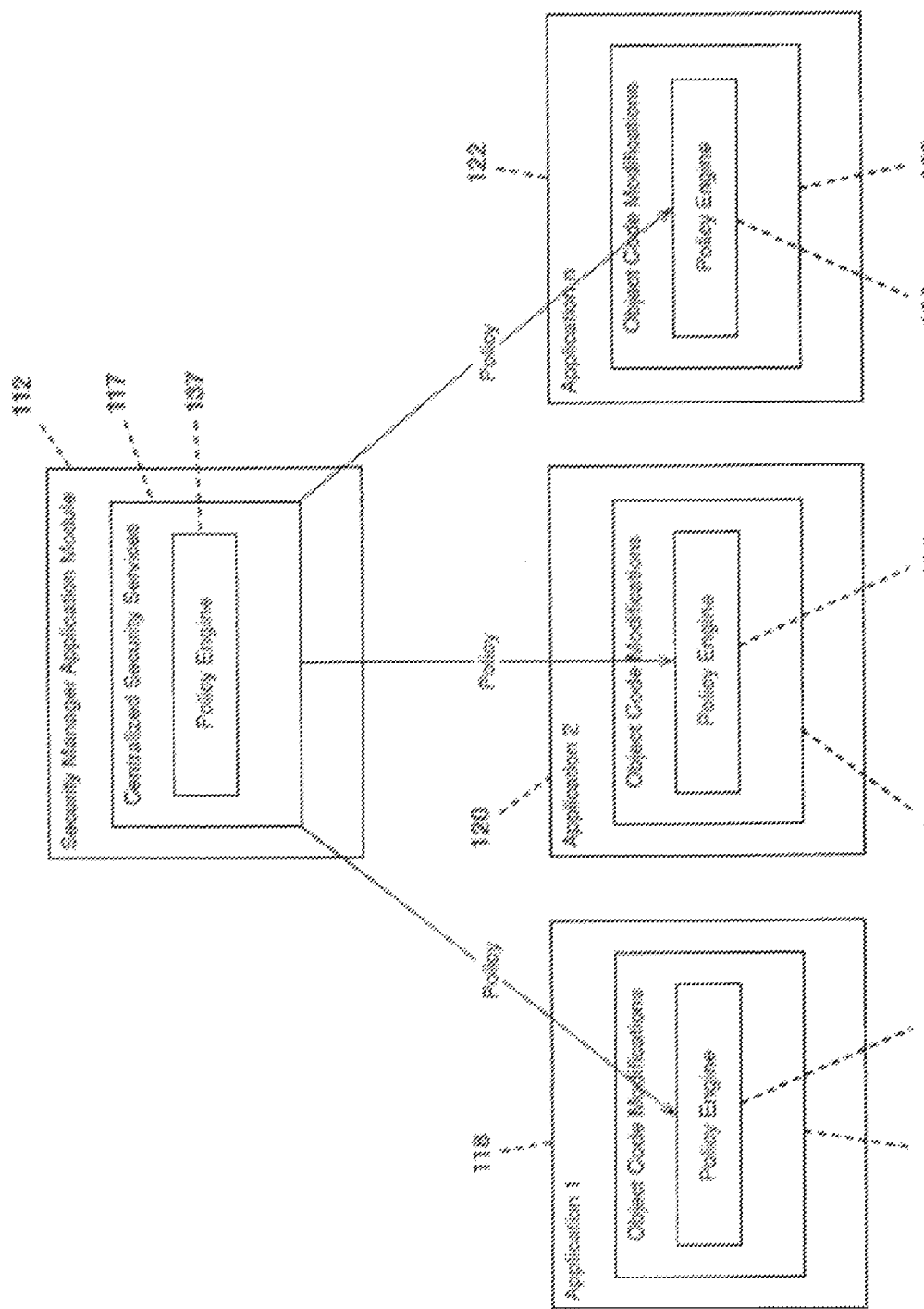

As can be appreciated, the software applications 132-136 may be linked to the security services provided by the security manager application module 112, as shown in FIGS. 7-9. As shown in FIG. 8, the policies enforced by the policy engine 132-136 may change in real-time (are dynamic). This may be based on various factors, including but not limited to, the execution context, various counters, external events, explicit policy redefinition, and changing group and role membership of the user of the device.

As shown in FIGS. 7-11, the security manager application module 112 may optionally include a policy engine 137. The policy engine 132-136 may support processing of commands sent to the software application 118-122, including remote lock, wipe, disablement, and the like. The processing of a wipe command may result in the software application 118-122 being set back to its initial (unused) state. The individual policies (and commands) may apply to all software applications 118-122, a portion of the software applications 118-122, a single software application 118, or a part of a software application 118.

Figure 10:
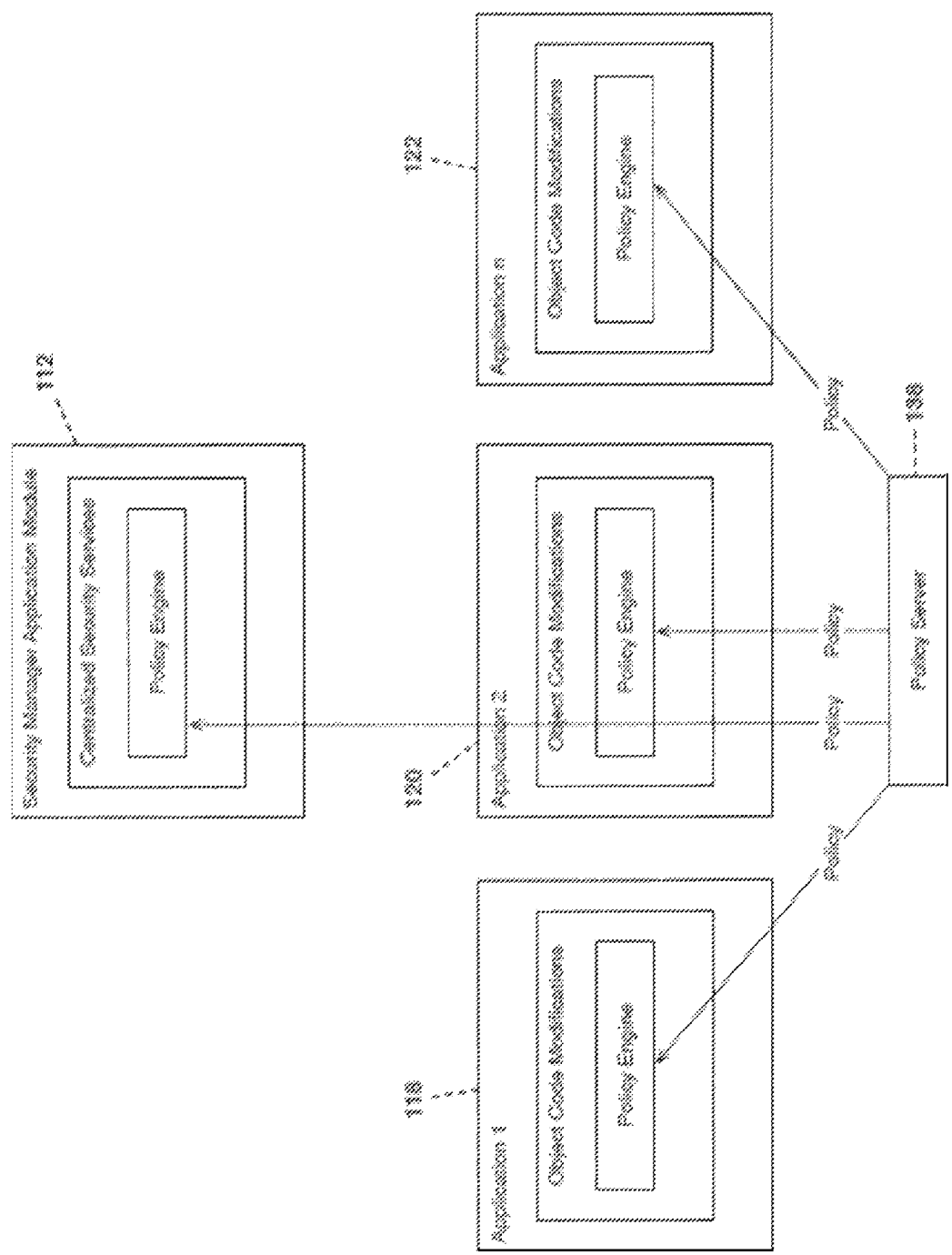
Figure 11:
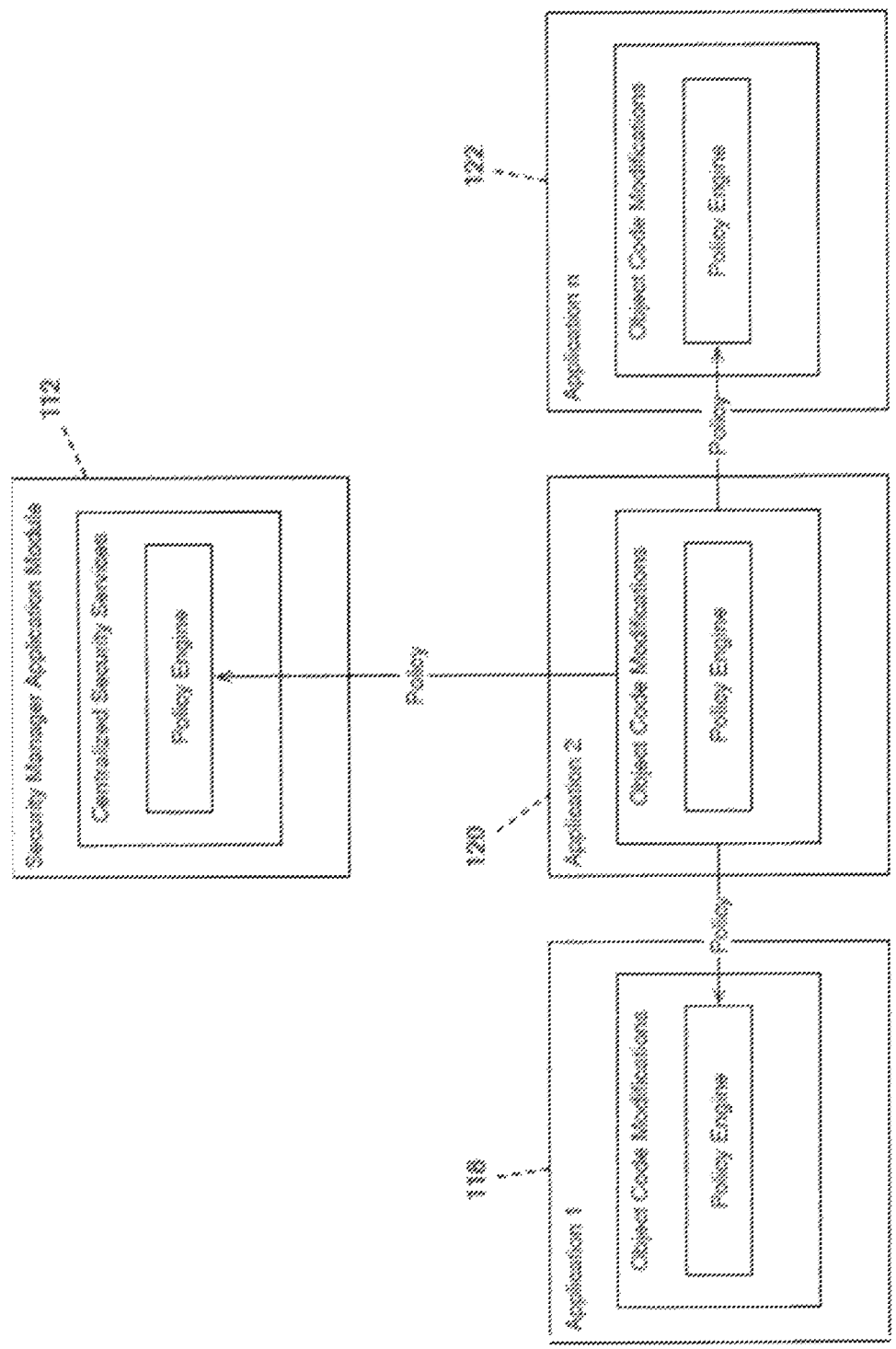

The policies (and commands) may be retrieved by each software application 118-122 from the security manager application module 112, as shown in FIG. 9. Alternatively, as shown in FIG. 10, the policies (and commands) may be retrieved by each software application 118-122 from a policy server 138 that is external to the device. In one embodiment, the policies (and commands) may be retrieved by each software application 118-122 from the security manager application module 112, which retrieves policies (and commands) from the policy server 138 that is external to the device. As shown in FIG. 11, the policies (and commands) may also be retrieved by each software application 118-122 (including the security manager application module 112) from another software application 118-122 that previously retrieved the policies (and commands). As can be appreciated, the retrieval of policies (and commands) by each software application 118-122 (including the security manager application module 112) may be performed using various methods including, but not limited to, push mechanisms, pull mechanisms, polling, callback functions, registering for events, broadcasts, and the like.

In one embodiment, the enforcement of a policy or the execution of a command may result in execution results being generated. The execution results may be sent back to the security manager application module 112 and/or the policy server 138. In one embodiment, the execution results may be audit events. The execution results may be data used for the purpose of gathering statistics about the usage of an application. The execution results may also be data used for the purpose of determining how long it has been since one or more software applications 118-122 have been used. As can be appreciated, the method by which policies may be enforced and commands may be executed in each software application 118-122 may involve the object code modification process previously described.

Artisans of skill in the art would recognize that several securities services may be provided to the software applications 118-122 by the security manager application module 112 after their object code is modified. For example, security services may include authentication, authorization, auditing, single sign-on, protection of data at rest, protection of data in transit, data leakage protection policy enforcement, access control policy enforcement, application command execution, key management, key distribution, secure data sharing between programs, secure communication between software applications 118-122, provisioning, application lifecycle management, compromised platform detection, compromised application detection, and the like.

Additionally, artisans skilled in the art would recognize that there are several types of authentication, single sign on, data leakage protection policies, access control policies, application commands and security artifacts that may be used. Types of authentication may include password, PKI certificate, challenge/response, one time password, security token, biometrics, and the like. Types of single sign-on may include Kerberos, NTLM, SAML, OpenID, OAuth, WS-Fed, password, HTTP Cookie, and the like. Types of data leakage protection policies that can be enforced may include no offline storage, no backups, restrict open-in to trusted applications, restrict copy/paste to trusted applications, no email, no messaging, no chat, no social sharing, no printing, and the like. Types of access control policies that can be enforced may include authentication strength, authentication frequency, idle timeout, authentication session duration, list of enabled applications, website and web-service blacklist/whitelist, compromise detection, inactivity duration, time-fence, geo-fence, and the like. Types of application commands that can be executed may include application disablement, remote lock, remote wipe, and the like. Types of security artifacts distributed to software applications 118-122 may include user credentials, authentication tokens, single sign-on tokens, identifiers, data leak protection policies, application policies, application commands, application configurations, and the like.

Figure 12:
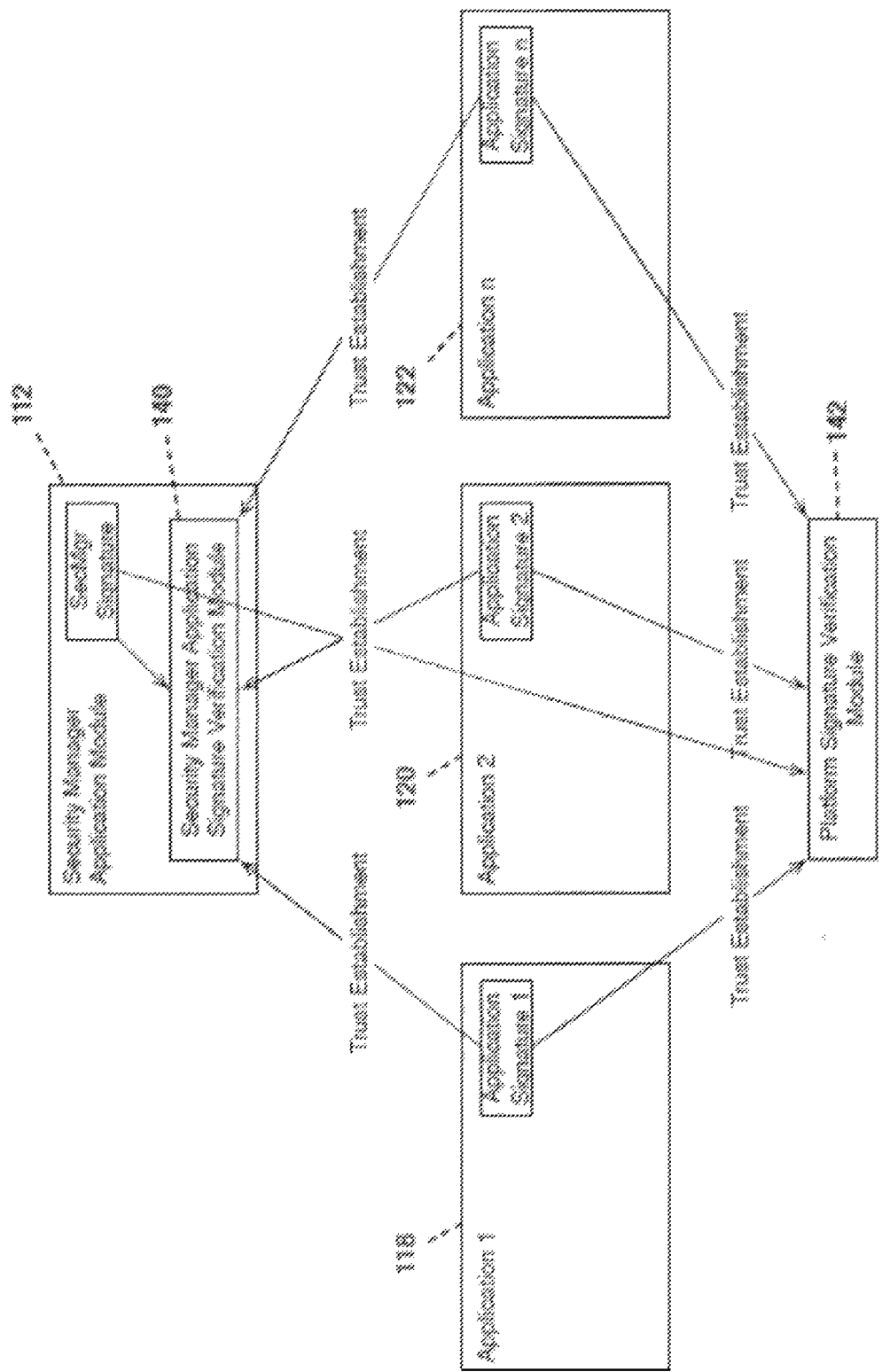
FIG. 12 is an exemplary block diagram illustrating a method of establishing trust between software applications using a security manager application module, according to an embodiment of the present disclosure.

As can be appreciated, the security manager application module 112 may be used to establish trust between software applications 118-122 on a device, such as a mobile device, in a manner that provides security services and sensitive data to trusted applications. FIG. 12 is an exemplary block diagram illustrating a method of establishing trust between software applications 118-122 using the security manager application module 112, according to an embodiment of the present disclosure. The security manager application module 112, responsive to a request, via the software application 118-122, for the security service, facilitates the security service if the software application 118-122 is signed with a common PKI key. The signature of each software application 118-122 may be verified when the software application 118-122 is installed by leveraging existing computing platform capabilities and/or the security manager application module 112. The computing platform may verify signature of each software application 118-122 via a platform signature verification module 142, while the security manager application module 112 may verify signature of each software application 118-122 via a security manager application signature verification module 140, as shown in FIG. 12. In one embodiment, the security manager application module 112 may be used to confirm that the software application 118-122 and associated computing platform have not been compromised, and verify the signature of the software application 118-122.

The signature of each software application 118-122 may be verified at runtime, either leveraging existing computing platform capabilities and/or by the security manager application module 112. A shared communication mechanism available to software applications 118-122 signed with the same PKI key may be used to establish trust with the security manager application module 112 and the rest of the trusted software applications 118-122. An example of such a shared communication mechanism on the iOS platform is writing data to a keychain.

In one embodiment, an identifier contained in or associated with a certificate of the PKI key may be added to each of a group of software applications 118-122 in order for them to trust each other.

Figure 13:
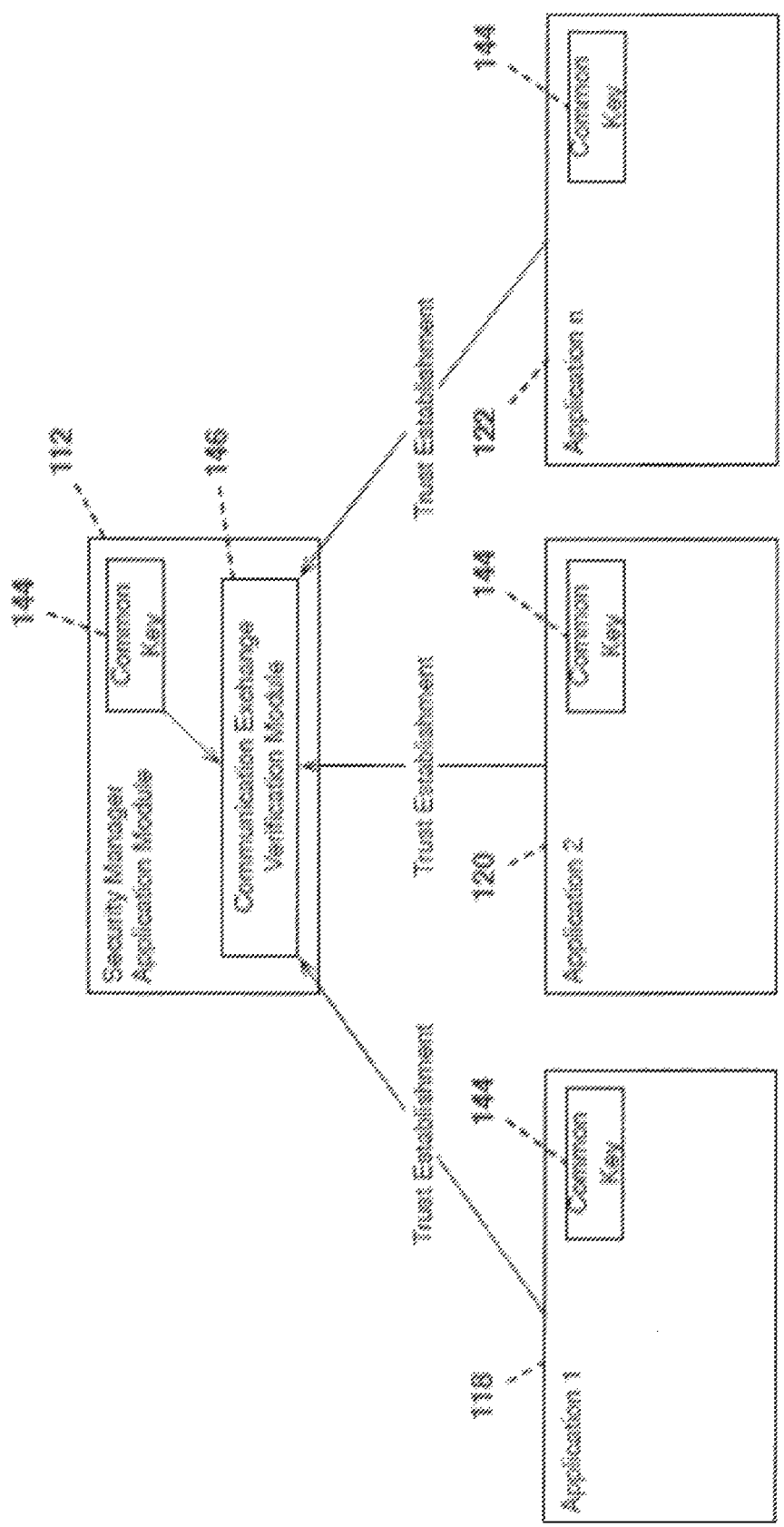
FIG. 13 is an exemplary block diagram illustrating a security manager application module in communication with software applications having a common key, according to an embodiment of the present disclosure.

In another embodiment, all applications are built with a common key embedded in them. In such instance, the plurality of application data comprise the common key. FIG. 13 is an exemplary block diagram illustrating a security manager application module 112 in communication with software applications 118-122 having a common key 144, according to an embodiment of the present disclosure. When the software application 118-122 wants to be trusted, it may initiate a communication exchange with a communication exchange verification module 146 of the security manager application module. This communication exchange may be encrypted and optionally signed or MACed with the common key 144. As can be appreciated, any of a multitude of specific and well-known cryptographic mechanisms can be used in this communication exchange to verify that the software application 118-122 that wants to be trusted and the security manager application module 112 share the same common key. Before verifying the communication exchange, the security manager application module 112 may be used to check that the computing platform and/or software application 118-122 have not been compromised.

Figure 14:
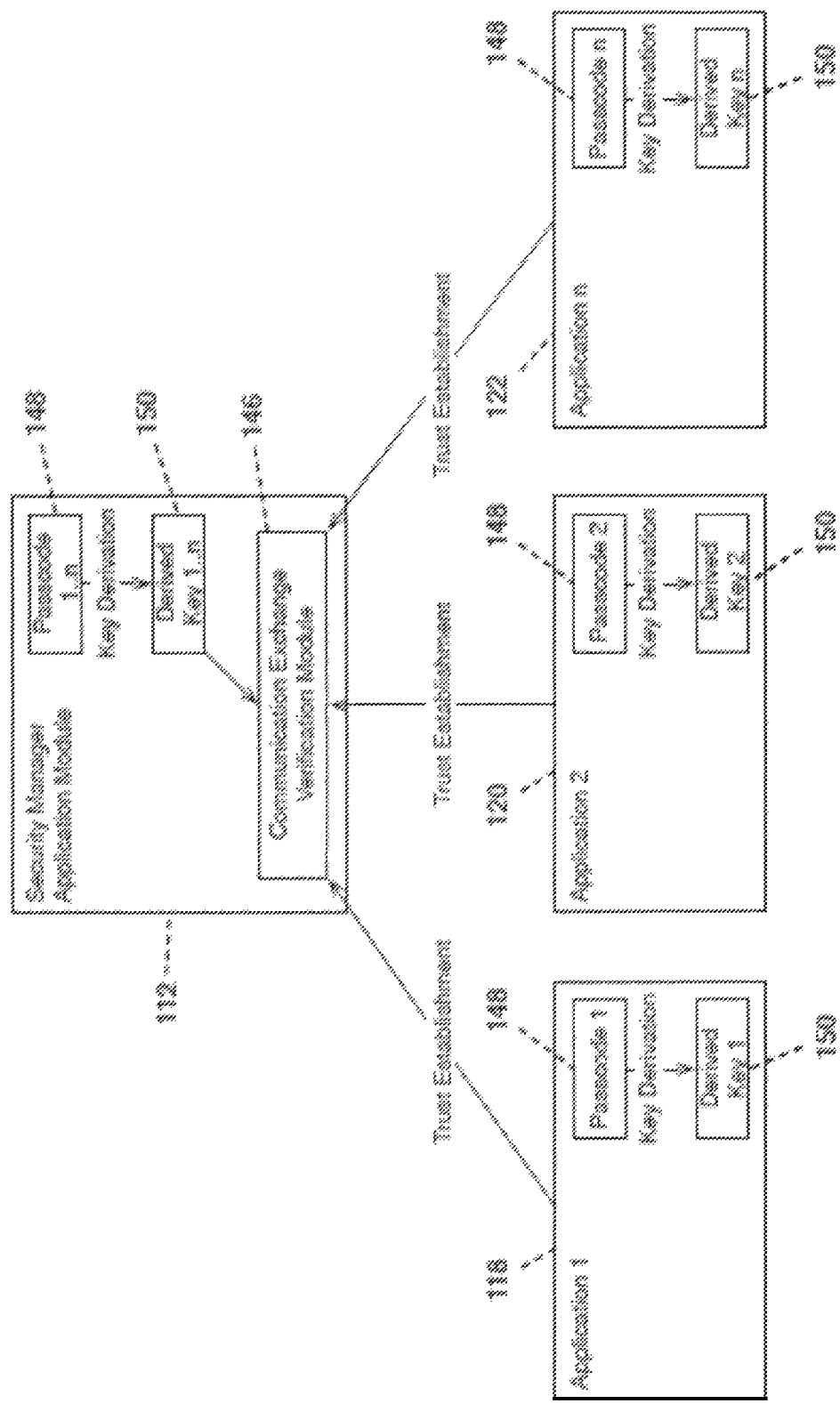
FIG. 14 is an exemplary block diagram illustrating passcode registration of software applications to establish trust with the security manager application module, according to an embodiment of the present disclosure.

FIG. 14 is an exemplary block diagram illustrating passcode registration of software applications 118-122 to establish trust with the security manager application module 112, according to an embodiment of the present disclosure. In one embodiment, when a software application 118-122 is first installed, it is untrusted. To receive trust, a software application 118-122 may make a registration call to the security manager application module 112. The security manager application module 112 may then present a dialog to the user indicating the name of the software application 118-122 that is asking to be trusted, and providing an application registration passcode 148. Before presenting this dialog, the security manager application module 112 may be used to check that the computing platform and/or software application 118-122 have not been compromised.

In one embodiment, the application registration passcode 148 may be entered in a corresponding dialog box prompted by the untrusted software application 118-122, and may then be used to derive a key 150 that is used to establish trust with the security manager application module 112 and the rest of the trusted software applications 118-122. This derived key 150 may be used to initiate a communication exchange with the communication exchange verification module 146 of the security manager application module 112. As described above, this communication exchange may be encrypted and optionally signed or MACed with the key 150. In one embodiment, before presenting this dialog, the modified object code may be used to check that the computing platform and/or the software application 118-122 have not been compromised.

As can be appreciated, the security manager application module 112 may be responsive to a registration request from the software application 118-122 to establish application trust. The security manager application module 118-122 may prompt a user to input an application registration passcode 148, and generate a key 150 to establish application trust using the application registration passcode 148 to facilitate the security services provided by the security manager application module 112 to the application software 118-122.

As the result of trust establishment using one of the methods, one or more security artifacts such as keys may be distributed from the security manager application module 112 to the newly trusted software application 118-122. These security artifacts may then be used to request security services or exchange data in a secure fashion. Thus, the security manager application module 112 may provide the key 150 to the software application 118-122 to allow the software application 118-122 transmit the request for the security service to the security manager application module 112.

As can be appreciated, the security manager application module 112 may be configured and/or programmed to share data between software applications 118-122 on a device in a way to facilitate the following: data can be freely shared between a group of trusted applications, but may not be exported to untrusted applications; data can be imported from untrusted applications to trusted applications; data stored inside trusted applications may be encrypted at all times; data shared between trusted applications may be encrypted in transit between trusted applications; large data objects may not need to be re-encrypted in order to be shared between applications, to avoid significant computation during sharing; and allow sharing of data between applications without requiring user interaction (accepting UI dialogs, etc.).

Further, the security manager application module 112 may be configured and/or programmed to display, via a user interface, the list of trusted software applications 118-122 when user interaction is desired to select from a list of what applications a given data object should be opened in (shared to). The data may include documents, security artifacts, policies, commands, requests/responses between applications, etc. The data may be created inside a trusted software application 118-122 on the device, inside an untrusted software application 118-122 on the device, or external to the device.

Figure 15:
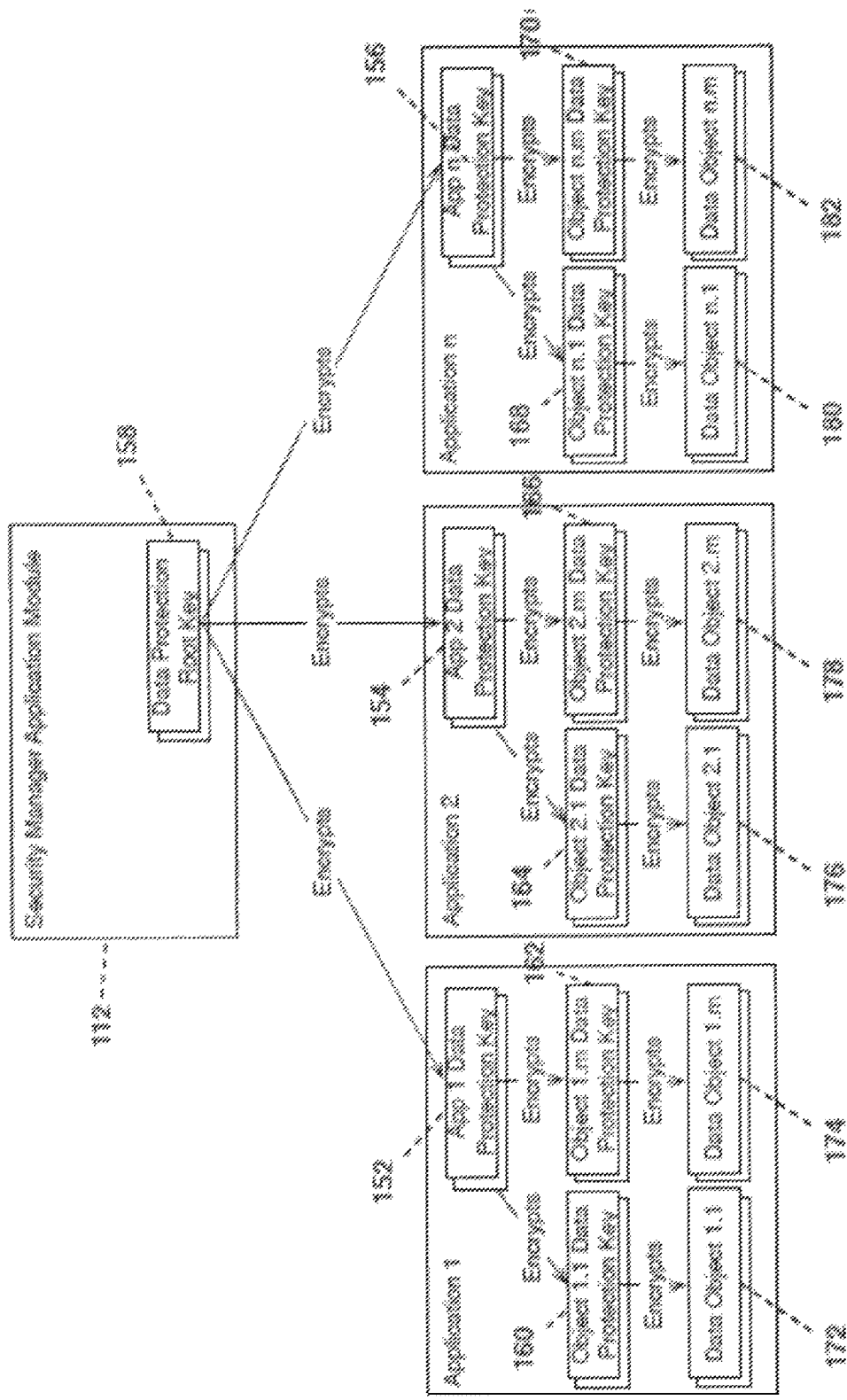
FIG. 15 is an exemplary block diagram illustrating the use of application data protection keys to maintain security within software applications, according to an embodiment of the present disclosure.

FIG. 15 is an exemplary block diagram illustrating the use of application data protection keys 152-156 to maintain security with the security manager application module 112, according to an embodiment of the present disclosure. As shown in FIG. 15, each software application 118-122 may include one or more unique application data protection keys 152-156. If a particular software application 118-122 is compromised, including its application data protection keys 152-156, this may be used to limit the exposure to just that software application 118-122. It also may decrease the frequency with which any given key is used, allowing it to be securely used for a longer time. The application data protection keys 152-156 for each software application 118-122 may be generated when trust is established with the security manager application module 112. They may be generated within the software application 118-122 itself or within the security manager application module 112.

One method of securely storing the application data protection keys 152-156 for the software application 118-122 is for the keys to be persisted within the software application 118-122 itself in encrypted form, encrypted by one of a plurality of data protection root keys 158 maintained by the security manager application module 112. When the software application 118-122 needs to use an application data protection key 152-156, it may initiate a request/response exchange with the security manager application module 112 to decrypt the application data protection key 152-156 using the corresponding data protection root key 158. The request may contain the encrypted application data protection key 152-156 and the response may contain the decrypted application data protection key 152-156.

Another method of securely storing the application data protection keys 152-156 for the software application 118-122 is for the keys to be persisted within the security manager application module 112, encrypted by one of a plurality of data protection root keys 158 maintained by the security manager application module 112. When the application needs to use an application data protection key 152-156, it may initiate a request/response exchange with the security manager application module 112 to decrypt the application data protection key 152-156 using the corresponding data protection root key 158. The response may contain the decrypted application data protection key 152-156.

As can be appreciated, a modification to either of these two methods above may include having the security manager application module 112 providing the corresponding data protection root key 158 to the software application 118-122 for it to decrypt the application data protection key 152-156 itself.

As can be appreciated, the application data may comprise the application data protection key 152-156 generated by at least one of the software application 118-122 and the security manager application module 112. The application data protection key 152-156 may be encrypted and decrypted by a corresponding data protection root key 158 maintained with the security manager application module 112.

In one embodiment, the security manager application module 112 may be used to facilitate the transfer of encrypted data objects 172-182 between software applications 118-122. Data objects 172-182 may be encrypted with an object data protection key 160-170 that is unique to that data object 172-182 or set of related data objects 172-182. These object data protection keys 160-170 may further be encrypted with one or more of the application data protection keys 152-156 of the software application 118-122 within which they reside. This may enable sharing data objects 172-182 between software applications 118-122 without needing to unencrypt the data objects 172-182 during transfer or to re-encrypt the data objects 172-182. In general, encrypting and decrypting the object data protection key 160-170 is much faster than encrypting and decrypting the data object 172-82 itself, as most data objects 172-182 will be significantly larger than their object data protection keys 160-170.

Figure 16:
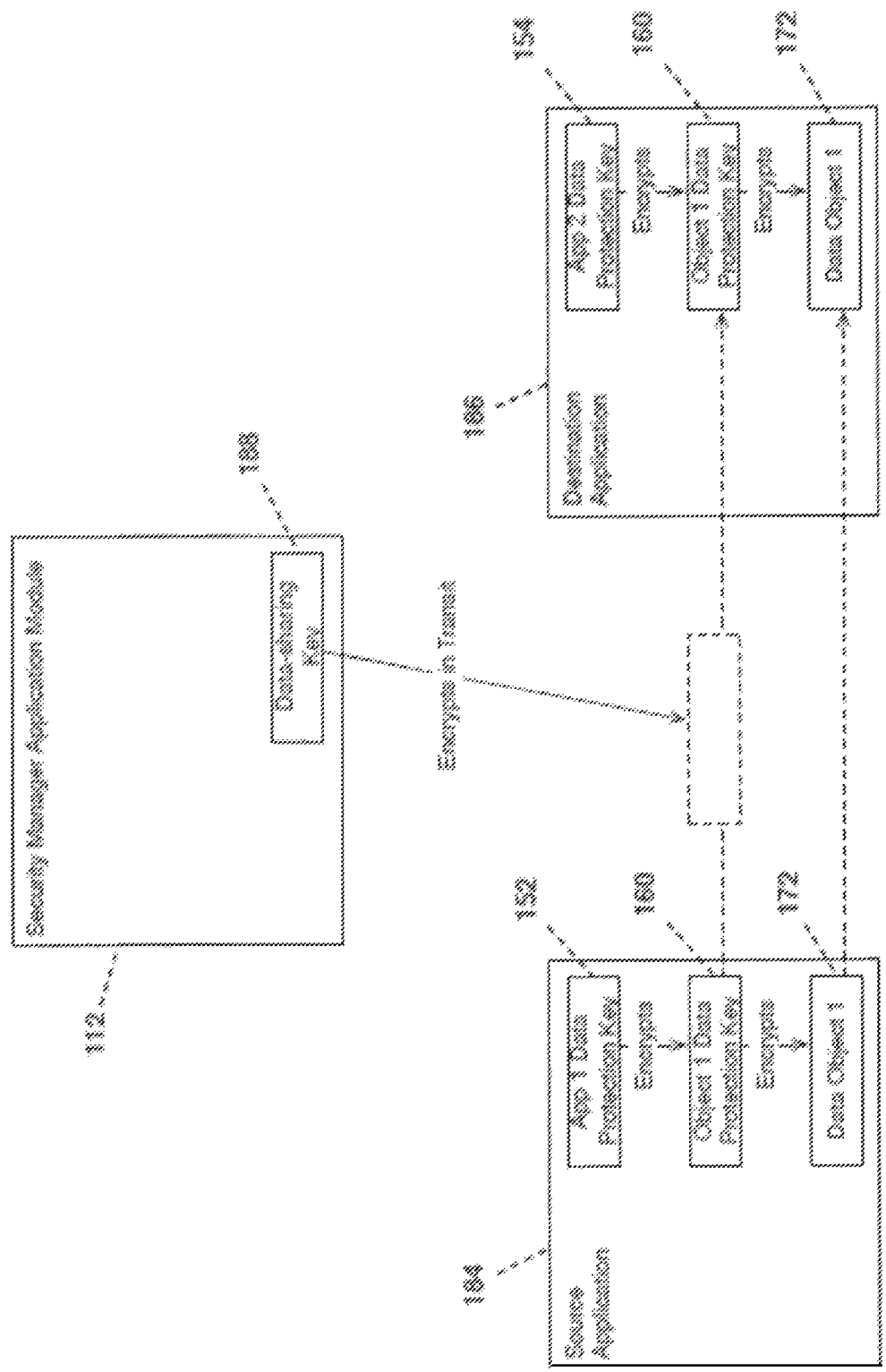
FIG. 16 is an exemplary block diagram illustrating a method for securely transferring the data object from a source (first) application to a destination (second) application, according to an embodiment of the present disclosure.

FIG. 16 is an exemplary block diagram illustrating a method for securely transferring the data object 172-182 from a source (first) application 184 to a destination (second) application 186, according to an embodiment of the present disclosure. The method may include decrypting the object data protection key 160 for the data object 172 with the application data protection key 152 of the source (first) application 184; and encrypting the object data protection key 160 for the data object 172 with a data-sharing key 188 generated by the security manager application module 112. The data-sharing key 188 may be transferred from the security manager application module 112 to the source (first) and destination (second) applications 184 and 186 when trust is established. The data-sharing key 188 may also be transferred to these software applications 184 and 186 on-demand when a new data object 172 needs to be shared, or be used by the security manager application module 112 for encryption and decryption in response to security service requests by the source (first) and destination (second) applications 184 and 186.

The method may further include transferring the data object 172 and the encrypted data protection key 160 for the data object 172 to the destination (second) application 186; decrypting the object data protection key 160 for the data object 172 with the data-sharing key 188; and encrypting the object data protection key 160 for the data object 172 with the application data protection key 154 of the destination (second) application 186.

As can be appreciated, the security manager application module 112 may generate the data-sharing key 188 for encrypting the object data protection key 169 prior to transferring the data object 172 and the object data protection key 169 from the source (first) software application 184 to the destination (second) software application 186, and decrypting the object data protection key 160 after transferring the data object 172 and the object data protection key 160 from the source (first) software application 184 to the destination (second) software application 186.

Figure 17:
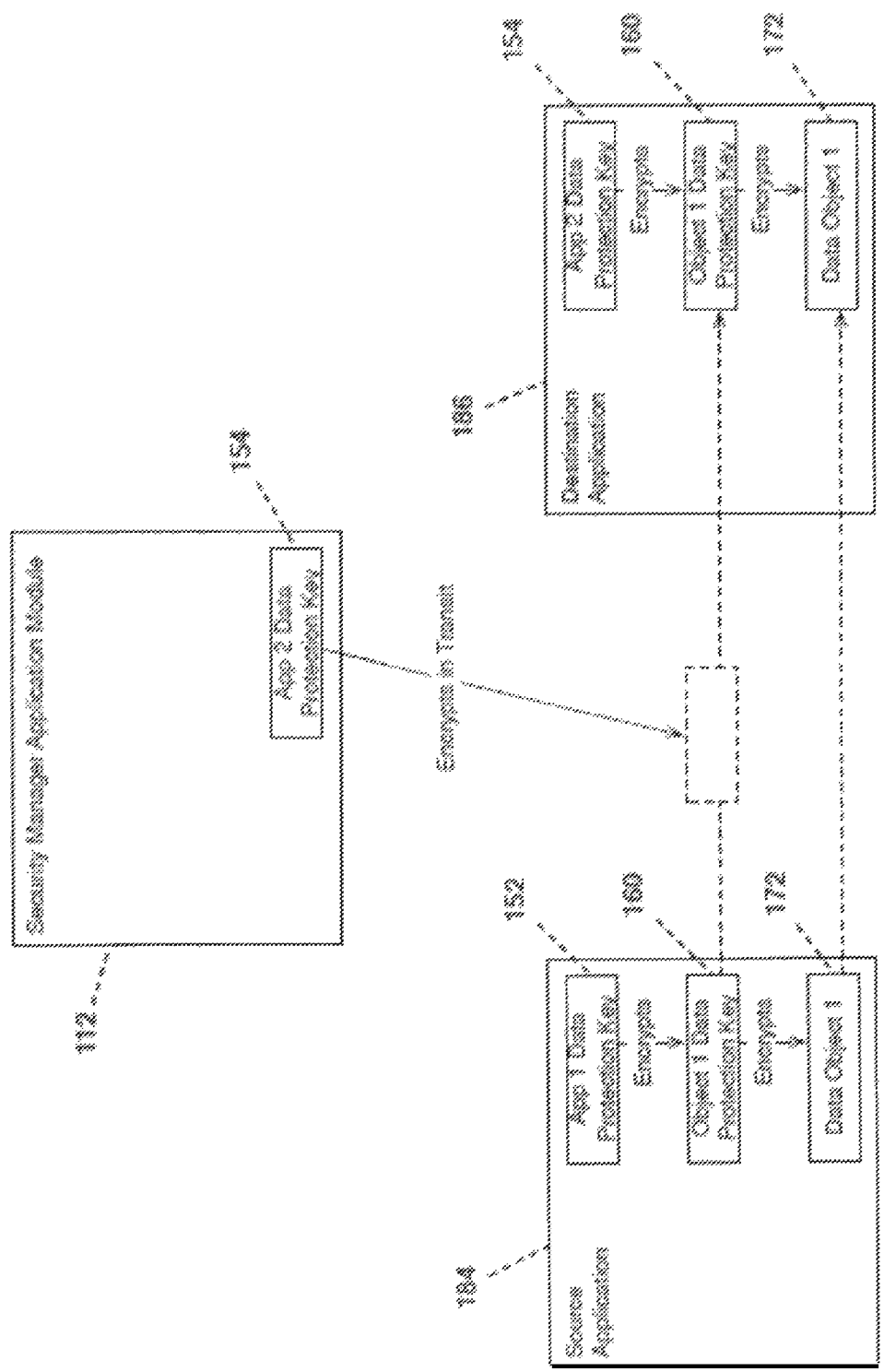
FIG. 17 is an exemplary block diagram illustrating another method for securely transferring the data object from a source (first) application to a destination (second) application, according to an embodiment of the present disclosure.

FIG. 17 is an exemplary block diagram illustrating another method for securely transferring the data object 172-182 from a source (first) application 184 to a destination (second) application 186, according to an embodiment of the present disclosure. The method may include decrypting the object data protection key 160 for the data object 172 with the application data protection key 152 of the source (first) application 184, and encrypting the object data protection key 160 for the data object 172 with the application data protection key 154 of the destination (second) application 186. The application data protection key 154 of the destination (second) application 186 may be transferred from the security manager application module 112 to the source (first) application 184 when trust is established. The application data protection key 154 of the destination (second) application 186 may also be transferred on-demand when a new data object 172 needs to be shared, or be used by the security manager application module 112 for encryption and decryption in response to a security service request by the source (first) application 184. The method may further include transferring the data object 172 and the encrypted object data protection key 160 for the data object 172 to the destination (second) application 186.

According to an embodiment of the present disclosure, the security manager application module 112 may be used to facilitate secure data sharing between applications on constrained platforms. A device platform may impose constraints on how data can be shared between software applications 118-122. Each platform may have various mechanisms for sharing data between software applications 118-122, but each mechanism may have specific limitations that makes it inappropriate for use by itself for secure data sharing. Each data sharing mechanism may have a maximum data size or place the entire data objects in memory 108, such that it cannot be used for sharing large data objects. It may be openly accessible to all software applications 118-122, such that it cannot be used for sharing sensitive data in unencrypted form. It may not support being launched programmatically with requiring user interaction, such that it cannot be used for automated programmatic sharing of data objects. It may also not transfer control to the destination application, such that it cannot be used for request/response processing. Additionally, it may be inactive when an application is not in the foreground, such that it cannot be used to receive data from another application.

Artisans skilled in the art would recognize that there are several classes of data sharing mechanisms. For example:

Class 1: A mechanism that transfers control to the destination application, does not require user interaction, and is only accessible to the source and destination applications, but cannot be used for sharing large data objects. An example of this class of mechanism is custom URL scheme processing on the iOS platform.

Class 2: A mechanism that can be used for sharing large data objects, does not require user interaction, and is accessible only to a limited set of trusted applications, but does not transfer control to the destination application. An example of this class of mechanism is the keychain on the iOS platform.

Class 3: A mechanism that can be used for sharing large data objects, does not require user interaction, but does not transfer control to the destination application and is openly accessible to all applications. An example of this class of mechanism is the pasteboard on the iOS platform.

Class 4: A mechanism that transfers control to the destination application, does not require user interaction, can be used for sharing large data objects, and is only accessible to the source and destination applications, but is only active for a short period of time as an application transitions to background and is inactive when an application is fully in the background. An example of this class of mechanism is a local receiving socket on the iOS platform.

Class 5: A mechanism that transfers control to the destination application, can be used for sharing large data objects, and is only accessible to the source and destination applications, but requires user interaction to select the destination application. An example of this class of mechanism is the open-in function for registered files types on the iOS platform.

In one embodiment, a method to securely share data from the source application 184 to the destination application 186 on a constrained platform without requiring user interaction is provided. The method includes transmitting instructions to the source application 184 to write a data object 172 using a Class 2 data sharing mechanism, and encrypting the data object 172 by the source application 184. The method may further include transmitting instructions to the source application 184 to use a Class 1 data sharing mechanism to transfer control to the destination application 186, including sufficient information to identify the data object 172 written using the Class 2 data sharing mechanism. The Class 1 data sharing mechanism may optionally include the object data protection key 160 that encrypts the data object 172 written using the Class 2 data sharing mechanism. Furthermore, the method may include transmitting instructions to the destination application 186 to read the data object 172 using the Class 2 data sharing mechanism and to decrypt the data object 172.

Another method that may be used to perform a secure request/response interaction between a requesting application and a responding application without requiring user interaction is provided. The requesting application may write a request using a Class 2 data sharing mechanism, where at least some part of the request is encrypted by the source application. The requesting application may use a Class 1 data sharing mechanism to transfer control to the responding application, including sufficient information to identify the request written using the Class 2 data sharing mechanism and the requesting application to respond to. The Class 1 data sharing mechanism may optionally include the key that encrypts the request written using the Class 2 data sharing mechanism. The responding application may read the request using the Class 2 data sharing mechanism and decrypt the encrypted part of the request. The responding application may also process the request and write a response using the Class 2 data sharing mechanism, where at least some part of the response is encrypted by the responding application. Furthermore, the responding application may use the Class 1 data sharing mechanism to transfer control back to the requesting application, including sufficient information to identify the response written using the Class 2 data sharing mechanism. The Class 1 data sharing mechanism may optionally include the key that encrypts the response written using the Class 2 data sharing mechanism. The requesting application may read the response using the Class 2 data sharing mechanism and decrypt the encrypted part of the response.

In another embodiment, as long as the request and response are not too large, the location of the request and optional key may be reversed in the previous method to result in the following method. The requesting application may write a key using a Class 2 data sharing mechanism. The requesting application may then use a Class 1 data sharing mechanism to transfer control to the responding application, sending a request of which at least some part is encrypted by the key, including sufficient information to identify the key written using the Class 2 data sharing mechanism and the requesting application to respond to. The responding application may then read the key using the Class 2 data sharing mechanism and decrypt the encrypted part of the request. Next, the responding application may process the request and optionally write a new key using the Class 2 data sharing mechanism. The responding application may use the Class 1 data sharing mechanism to transfer control back to the requesting application, sending a response of which at least some part is encrypted by the key (either the same key as the request or a new response key), including sufficient information to identify the key written using the Class 2 data sharing mechanism. Finally, the requesting application may read the key using the Class 2 data sharing mechanism and decrypt the encrypted part of the response.

Artisans skilled in the art would recognize other alternative methods for secure data sharing between applications on a constrained platforms in light of the description above, for example, different parts of the request, different parts of the response, and different parts of the key may be split between the Class 1 data sharing mechanism and the Class 2 data sharing mechanism in a multitude of ways. Alternatively, a Class 3 data sharing mechanism may be used in place of the Class 2 data sharing mechanism in the methods described above, for example, if any data written using the Class 3 data sharing mechanism is encrypted using application data protection keys as previously described. Another alternative includes a Class 4 data sharing mechanism (available temporarily in each software application 118-122 as it goes to the background) that may be used in place of the Class 2 data sharing mechanism in the methods described above, for example, if each data transfer can be performed within the short period of time before the application transitioning to the background becomes inactive.

In one embodiment, a method that can be used to securely share data from a trusted source application 184 to a trusted destination application 186 without requiring user interaction to select the destination application 186 but prevents the data from being exported to untrusted applications is provided. In this exemplary method, the source application 184 may write a data object 172 using a Class 5 data sharing mechanism. The data object 172 may be encrypted by the source application 186, and may be written as a unique data or file type such that when selecting from a list of the applications that support the given data or file type only the list of trusted applications are displayed. The destination application 186 may then read the data object 172 using the Class 5 data sharing mechanism and decrypt the data object 172. As can be appreciated, any of the methods previously described for securely transferring the data object 172 from the source application 184 to the destination application 186 may be used to encrypt and decrypt the data object 172.

According to an embodiment of the present disclosure, it may be preferred to transfer encrypted data objects using application data protection keys as previously described in order to minimize reliance on platform-level protections that may potentially be compromised using well-known techniques. For security, any transient data that is written using a data share mechanism that persists the data outside of the applications may be deleted after it is read.

As can be appreciated, any of the methods described above may be integrated, combined and/or utilized with one or more of the methods and systems disclosed in pending U.S. patent application Ser. No. 13/405,357, titled Methods and Apparatuses for Secure Communication, and U.S. patent application Ser. No. 13/215,178, titled Methods and Apparatuses for Interaction with Web Applications and Web Application Data, both of which are incorporated by reference herein in their entirety.

According to an embodiment of the present disclosure, a machine-readable medium that provides instructions, which when read by a machine having a processor 110 and a memory 108, cause the machine to perform operations according to any of the methods described above is also provided.

While the systems, methods, and machine readable media have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

It should also be understood that a variety of changes may be made without departing from the essence of the invention. Such changes are also implicitly included in the description. They still fall within the scope of the invention. It should be understood that this disclosure is intended to yield a patent or patents covering numerous aspects of the inventions both independently and as an overall system, machine-readable media and in both method and apparatus modes.

Further, each of the various elements of the inventions and claims may also be achieved in a variety of manners. This disclosure should be understood to encompass each such variation of an embodiment of any apparatus embodiment, a method, machine-readable medium or process embodiment, or even merely a variation of any element of these.

Particularly, it should be understood that as the disclosure relates to elements of the inventions, the words for each element may be expressed by equivalent apparatus terms of method terms—even if only the function or result is the same. Such equivalent, broader, or eve more generic terms should be considered to be encompassed in the description of each element or action. Such terms can be substituted where desired to make explicit the implicitly broad coverage to which this invention is entitled.

It should be understood that all actions may be expressed as a means for taking that action or as an element which causes that action. Similarly, each physical element disclosed should be understood to encompass a disclosure of the action which that physical element facilitates.

Any patents, publications, or other references mentioned in this application for patent are hereby incorporated by reference. In addition, as to each term used, it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans, incorporated herein by reference.

Further, all claim terms should be interpreted in their most expansive forms so as to afford the applicant the broadest coverage legally permissible. Although the embodiments have been described with reference to the drawings and specific examples, it will readily be appreciated by skilled artisans that many modifications and adaptations of the processes and apparatuses described herein are possible without departure from the spirit and scope of the invention. Thus, it is to be clearly understood that this description is made only by way of example and not as a limitation on the scope of the embodiments as claimed below.

What is claimed is:

1. A method for providing a security service from a central application to another application on a computing device, the method comprising:
   providing a first application configured to provide a security service on a computing device;
   providing a second application on the computing device, the second application having original, post-compile object code;
   modifying, using at least one processor operatively coupled with a memory, the original object code of the second application to create replacement object code, the replacement object code configured for communication with the first application, the replacement object code incorporating a policy engine configured to retrieve a security policy and process a command that sets the second application to an initial, unused state, wherein the security policy is retrieved from a server that is remote from the computing device.

2. The method of claim 1, wherein the original object code is modified by at least one technique selected from the group consisting of introducing a dynamic library, introducing a static library introducing an additional load command, symbol replacement, pointer swizzling, and interposing.

3. The system method of claim 1, further comprising:
   generating, by the first application, a security artifact selected from the group consisting of authentication tokens, a key, a security credential, a single sign on token, an identifier, a security policy, a security command, a security configuration, a session handle, a session token, and a secure communications, channel, and
   transmitting the security artifact from the first application to the second application in response to the requesting of the security service.

4. The method of claim 1, wherein the original object code includes unsigned code.

5. The method of claim 1, further comprising:
   converting the original object code from a signed form to an unsigned form before the modifying; and
   converting the replacement object code from an unsigned form to a signed form after the modifying.

6. The method of claim 1, wherein the computing device is a mobile device.

7. The method of claim 1, wherein the modifying includes modifying at least one of a programmatic interface, a class, an object, and a function.

8. The method of claim 1, wherein the modifying of the original object code of the second application includes introducing the policy engine for ensuring compliance with multiple security policies.

9. The method of claim 1, wherein the security policy is selected from the group consisting of data leakage prevention policy and an access control policy.

10. The method of claim 1, further comprising:
    transmitting from the first application the security policy to the second application for execution.

11. The method of claim 10, wherein the security policy applies to at least one of a portion of the second application, a single software application, and a plurality of software applications.

12. The method of claim 1, wherein the security policy is based on at least one factor selected from the group consisting of execution context, external events, explicit policy redefinition, and changing group and role membership.

13. The method of claim 1, further comprising: introducing the policy engine from the second application into a third application by modifying object code of the third application.

14. The method of claim 1, wherein data resulting from execution of the replacement object code is transmitted to the first application or the remote server.

15. The method of claim 1, wherein the first application, responsive to the request for the security service, facilitates the security service if the software application is signed with a public key infrastructure (PKI) key.

16. The method of claim 15, further comprising:
    confirming, by the first application, that the second application and computing device have not been comprised; and
    verifying a signature of the first application.

17. The method of claim 1, wherein the security service provides a common key to the second application and a third application.

18. The method of claim 1, wherein the first application is responsive to a registration request from the second application to establish application trust, the first application:
prompting a user to input an application registration passcode; and
generating a key to establish application trust using the application registration passcode to facilitate the security service provided by the first application to the second application.

19. The method of claim 18, wherein the first application the key to the second application to allow the second application to transmit the request for the security service.

20. The method of claim 1, further comprising:
generating an application data protection key, the application data protection key encrypted and decrypted by a corresponding data protection root key maintained with the first application.

21. The method of claim 20, wherein the application data protection key performs at least one of encrypting and decrypting an object data protection key to facilitate data object transfer from a first software application to a second software application.

22. The method of claim 21, further comprising:
generating a data-sharing key for encrypting the object data protection key prior to transferring the data object and the object data protection key from the first application to the second software application; or
generating a data-sharing key for decrypting the object data protection key after transferring the data object and the object data protection key from the first software application to the second software application.

23. The method of claim 21, wherein at least one of the first application and the second application:
decrypts the object data protection key for the data object with the application data protection key of the first software application, and
encrypts the object data protection key for the data object with the application data protection key of the second software application.

24. The method of claim 1, wherein the policy engine of the replacement object code is configured to retrieve a security policy that applies to a single software application.

25. The method of claim 1 further comprising:
providing a third application on the computing device, the third application having original, post-compile object code; and
modifying the original object code of the third application to create replacement object code incorporating a policy engine configured to retrieve a second security policy and process a command that set the third application to an initial, unused state.

26. A machine-readable non-transitory storage medium embodying information indicative of instructions for causing one or more machines to perform the operations comprising:
providing a first application configured to provide a security service on a computing device;
providing a second application on the computing device, the second application having original, post-compile object code;
modifying, using at least one processor operatively coupled with a memory, the original object code of the second application to create replacement object code, the replacement object code configured for communication with the first application, the replacement object code incorporating a policy engine configured to retrieve a security policy and process a command that sets the second application to an initial, unused state, wherein the security policy is retrieved from a server that is remote from the computing device.

27. The medium of claim 26, wherein the policy engine of the replacement object code is configured to retrieve a security policy that applies to a single software application.

28. A computer system executing instructions in a computer program, the computer system comprising:
a processor; and
a memory operatively coupled with a processor, the processor executing program code from the memory comprising:
program code for providing a first application configured to provide a security service on a computing device;
program code for providing a second application on the computing device, the second application having original, post-compile object code;
program code for modifying, using at least one processor operatively coupled with a memory, the original object code of the second application to create replacement object code, the replacement object code configured for communication with the first application, the replacement code incorporating a policy engine configured to retrieve a security policy and process a command that sets the second application to an initial, unused state, wherein the security policy is retrieved from a server that is remote from the computing device.

29. The system of claim 28, wherein the original object code is modified by at least one technique selected from the group consisting of introducing a dynamic library, introducing a static library, introducing an additional load command, symbol replacement, pointer swizzling, and interposing.

30. The system of claim 28, further comprising:
generating, by the first application, a security artifact selected from the group consisting of authentication tokens, a key, a security credential, a single sign-on token, an identifier, a security policy, a security command, a security configuration, a session handle, a session token, and a secure communications channel, and
transmitting the security artifact from the first application to the second application in response to the requesting of the security service.

31. The system of claim 28, wherein the policy engine of the replacement object code is configured to retrieve a security policy that applies to a single software application.

32. The system of claim 28 wherein the processor executes program code from the memory further comprising:
program code for providing a third application on the computing device, the third application having original, post-compile object code; and
program code for modifying the original object code of the third application to create replacement object code incorporating a policy engine configured to retrieve a second security policy and process a command that set the third application to an initial, unused state.

* * * * *